US010909152B2

(12) United States Patent
Canim et al.

(10) Patent No.: US 10,909,152 B2
(45) Date of Patent: *Feb. 2, 2021

(54) PREDICTING INTENT OF A USER FROM ANOMALOUS PROFILE DATA

(71) Applicant: International Business Machines Corporation, Armonk, NY (US)

(72) Inventors: Mustafa Canim, Ossining, NY (US); Robert G. Farrell, Cornwall, NY (US); John A. Gunnels, Somers, NY (US); Arun K. Iyengar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,631

(22) Filed: Dec. 19, 2019

(65) Prior Publication Data

US 2020/0133966 A1 Apr. 30, 2020

Related U.S. Application Data

(63) Continuation of application No. 16/553,895, filed on Aug. 28, 2019, now Pat. No. 10,572,517, which is a
(Continued)

(51) Int. Cl.
*G06F 16/332* (2019.01)
*G10L 15/18* (2013.01)
(Continued)

(52) U.S. Cl.
CPC .......... *G06F 16/3329* (2019.01); *G10L 15/16* (2013.01); *G10L 15/1815* (2013.01); *H04L 67/306* (2013.01); *G10L 15/26* (2013.01)

(58) Field of Classification Search
CPC ... H04L 67/306; G06F 16/3329; G10L 15/16; G10L 15/1815; G10L 15/265
See application file for complete search history.

(56) References Cited

U.S. PATENT DOCUMENTS

| 5,541,836 A | 7/1996 | Church et al. |
| 8,370,284 B2 | 2/2013 | Garg et al. |

(Continued)

FOREIGN PATENT DOCUMENTS

EP 2370894 A2 10/2011

OTHER PUBLICATIONS

List of IBM Patents or Patent Applications Treated as Related, Dec. 19, 2019, 2 pages.

(Continued)

*Primary Examiner* — Regina N Holder
(74) *Attorney, Agent, or Firm* — Stephen J. Walder, Jr.; Diana R. Gerhardt

(57) ABSTRACT

Mechanisms are provided for conducting a natural language dialogue between the automatic dialogue system and a user of a client computing device. An automatic dialogue system receives natural language text corresponding to a user input from the user via the client computing device, the natural language text having an ambiguous portion of natural language text. The automatic dialogue system analyzes user profile information corresponding to the user to identify an anomaly in the user profile information and predicts a user intent associated with the anomaly. The automatic dialogue system disambiguates the ambiguous portion of the natural language text based on the predicted user intent and generates a response to the user input based on the disambiguated natural language text which is output to the client computing device to thereby conduct the natural language dialogue.

16 Claims, 11 Drawing Sheets

Related U.S. Application Data continuation of application No. 15/884,887, filed on Jan. 31, 2018, now Pat. No. 10,430,447.

(51) Int. Cl.
*H04L 29/08* (2006.01)
*G10L 15/16* (2006.01)
*G10L 15/26* (2006.01)

(56) References Cited

U.S. PATENT DOCUMENTS

| | | |
|---|---|---|
| 8,977,584 B2 | 3/2015 | Jerram et al. |
| 9,235,978 B1 | 1/2016 | Charlton |
| 9,292,254 B2 | 3/2016 | Simpson et al. |
| 9,319,522 B1 | 4/2016 | Webster |
| 9,424,862 B2 | 8/2016 | Jerram et al. |
| 9,516,053 B1 | 12/2016 | Muddu et al. |
| 10,102,359 B2 | 10/2018 | Cheyer |
| 10,430,447 B2 | 10/2019 | Canim et al. |
| 2007/0130128 A1 | 7/2007 | Garg et al. |
| 2008/0155472 A1 | 6/2008 | Runge et al. |
| 2010/0114887 A1 | 5/2010 | Conway et al. |
| 2011/0125734 A1 | 5/2011 | Duboue et al. |
| 2012/0072222 A1 | 3/2012 | Alonso et al. |
| 2014/0074589 A1 | 3/2014 | Nielsen et al. |
| 2015/0112895 A1 | 4/2015 | Jerram et al. |
| 2015/0170671 A1 | 6/2015 | Jerram et al. |
| 2015/0293755 A1 | 10/2015 | Robins et al. |
| 2016/0005049 A1 | 1/2016 | Menezes et al. |
| 2016/0071126 A1 | 3/2016 | Chang et al. |
| 2016/0188565 A1 | 6/2016 | Robichaud et al. |
| 2017/0140387 A1 | 5/2017 | Nandi et al. |
| 2018/0027006 A1 | 1/2018 | Zimmerman et al. |
| 2018/0046923 A1 | 2/2018 | Jerram et al. |
| 2018/0047201 A1 | 2/2018 | Filev et al. |
| 2018/0068031 A1 | 3/2018 | Hewavitharana et al. |
| 2018/0108066 A1 | 4/2018 | Kale et al. |
| 2019/0236204 A1 | 8/2019 | Canim et al. |
| 2019/0237068 A1 | 8/2019 | Canim et al. |
| 2019/0333512 A1 | 10/2019 | Canim et al. |
| 2019/0384784 A1 | 12/2019 | Canim et al. |

OTHER PUBLICATIONS

Bowman, Samuel R. et al., "Recursive Neural Networks Can Learn Logical Semantics", Proceedings of the 3rd Workshop on Continuous Vector Space Models and their Compositionality (CVSC), Beijing, China, Jul. 26-31, 2015, 10 pages.

Dong, Li et al., "Language to Logical Form with Neural Attention", http://homepages.inf.ed.ac.uk/s1478528/acl16-lang2logic-slides.pdf, ACL Aug. 7-12, 2016, Berlin, Germany, 25 pages.

High, Rob, "The Era of Cognitive Systems: An Inside Look at IBM Watson and How it Works", IBM Corporation, Redbooks, Dec. 12, 2012, 16 pages.

Zettlemoyer, Luke S. et al., "Learning to Map Sentences to Logical Form: Structured Classification with Probabilistic Categorial Grammars", Proceedings of the Twenty-First Conference on Uncertainty in Artificial Intelligence (UAI2005); Edinburgh, Scotland Jul. 26-29, 2005, 9 pages.

PREDICTING INTENT OF A USER FROM ANOMALOUS PROFILE DATA

BACKGROUND

The present application relates generally to an improved data processing apparatus and method and more specifically to mechanisms for predicting intent of a user from anomalous profile data.

A dialogue system, or conversational agent (CA) is a computer system intended to converse with a human. Dialog systems have employed text, speech, graphics, haptics, gestures and other modes for communication on both the input and output channel. There are many different architectures for dialog systems. What sets of components are included in a dialog system, and how those components divide up responsibilities differs from system to system.

Principal to any dialog system is the dialog manager, which is a component that manages the state of the dialog, and dialog strategy. A typical activity cycle in a dialog system contains the following phases. Initially, the user speaks, and the input is converted to plain text by the system's input recognizer/decoder, which may include automatic speech recognizer (ASR), gesture recognizer, or handwriting recognizer, or the like. The generated text is analyzed by a natural language processing (NLP) system, which may include logic for performing proper name identification, part of speech tagging, syntactic/semantic parsing, and the like.

The semantic information is analyzed by the dialog manager, which keeps the history and state of the dialog and manages the general flow of the conversation. Usually, the dialog manager contacts one or more task managers which have knowledge of the specific task domain to perform various tasks on the natural language text based on the NLP system operations, to perform domain specific actions. The dialog manager produces output using an output generator. The output is rendered using an output renderer, which may include performing text-to-speech translation, rendering a graphical representation, outputting a textual response, or the like.

In speech or text based dialogue systems, such as automated customer service systems, users communicate with the system through spoken utterances or short text messages, provided in a natural language. Once a user input (spoken utterance or text input) is received, the automated system attempts to process/analyze the user utterance to reduce it to a computer understandable form. Given this unambiguous interpretation of the utterance, the system can perform tasks or produce a response, such as an answer to a question asked by the user. However, some user utterances, text inputs, or portions thereof, may be ambiguous to the dialogue system. For example, the term "it" in spoken or text input may be ambiguous as to what "it" is referring to. As a result of this reference ambiguity, the dialogue system may ignore, or skip the ambiguous portions of the user input. This may reduce the many possible interpretations that the dialogue system considers, which in turn leads to a potentially inaccurate or non-optimized response. This may lead to frustration on the part of the user in that the user may feel that they are receiving inaccurate responses and are not being listened to correctly.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions executed by the at least one processor to cause the at least one processor to implement an automatic dialogue system, for conducting a natural language dialogue between the automatic dialogue system and a user of a client computing device. The method comprises receiving, by the automatic dialogue system, natural language text corresponding to a user input from the user via the client computing device, the natural language text having an ambiguous portion of natural language text. The method further comprises analyzing, by the automatic dialogue system, user profile information corresponding to the user to identify at least one anomaly in the user profile information and predicting, by the automatic dialogue system, at least one user intent associated with the at least one anomaly. The user intent indicates a potential reason for the user input from the user. The method also comprises disambiguating, by the automatic dialogue system, the ambiguous portion of the natural language text based on the predicted at least one user intent to generate a disambiguated natural language text corresponding to the user input. Moreover, the method comprises generating, by the automatic dialogue system, a response to the user input based on the disambiguated natural language text and outputting, by the automatic dialogue system, the response to the client computing device to thereby conduct the natural language dialogue.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
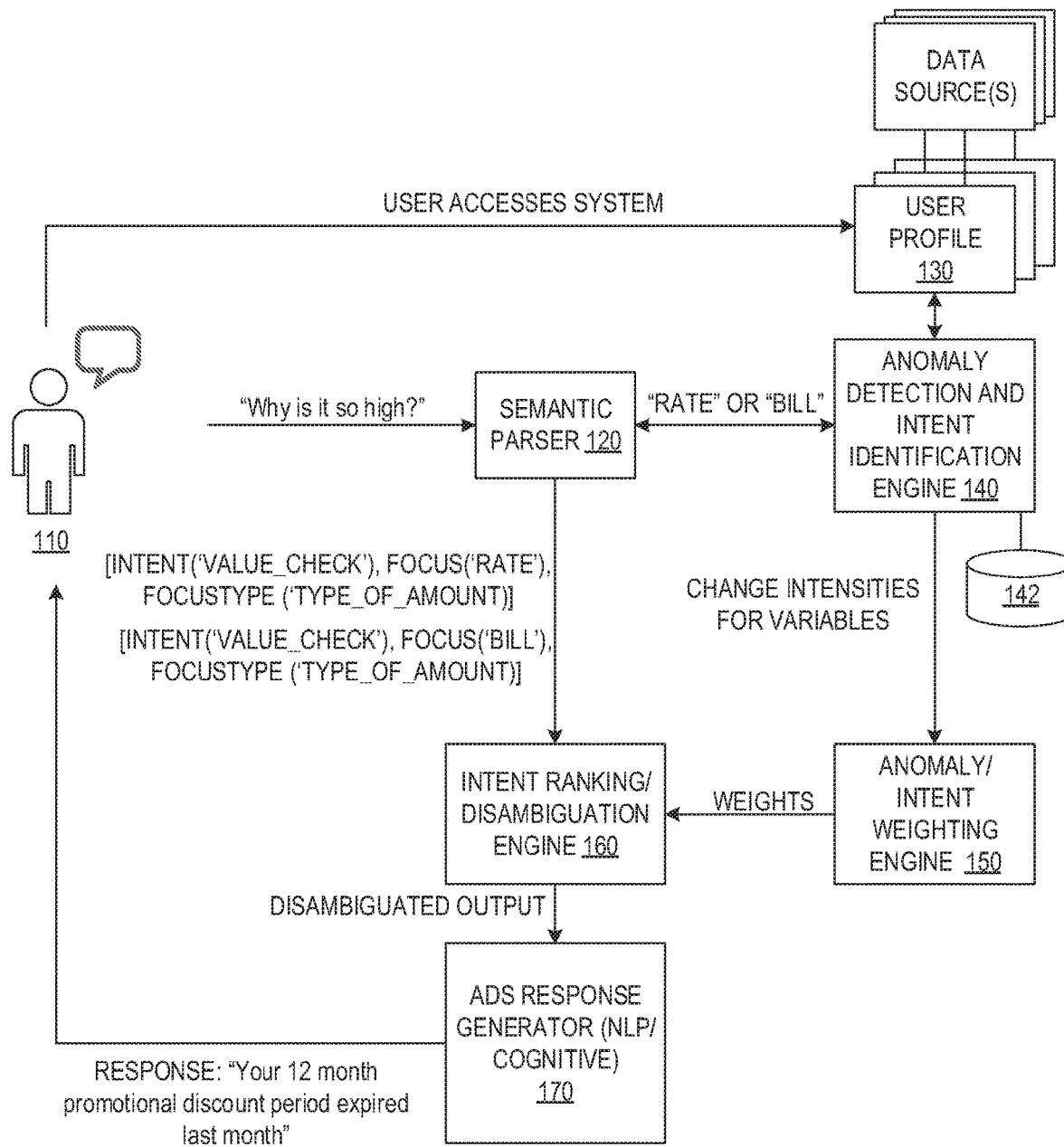
FIG. 1 is an example diagram illustrating an information flow for a user-automated dialogue system (ADS) interaction in accordance with one illustrative embodiment.

The illustrative embodiments provide mechanisms for predicting the intent of a user from anomalous user profile data and utilizing such predictions to improve dialogue system operation by resolving ambiguities in user interactions. An intent is a purpose/goal/reason behind an utterance, either textual or audible, exchanged with a dialogue system. For example, an intent may express whether the user wants the dialogue system to check the value of some variable against some reference amount or retrieve the amount of a variable or explain a variable. As noted above, in dialogue systems, some user speech utterances, text input, or portions thereof, may be ambiguous to the dialogue system and may reduce the accuracy of the generated responses, leading to user frustration. However, determining a likely intent of a user, e.g., complaining about a bill, questioning a rate increase, etc., may assist in resolving such ambiguities. Thus, it would be beneficial to have a mechanism for predicting the likely intent of the user in a natural language dialogue.

For example, a user may contact an automated customer service system with the intent to obtain information about something, get something fixed, complain about something, or a plethora of other possible reasons. The issue addressed by the illustrative embodiments is, when the user interacts with the dialogue system during a dialogue session with the automated customer service system, whether the automated customer service system can analyze information about the user and try to predict why the user could be contacting the automated customer service system, e.g., based on the user profile, recent bill information, information recently presented to the user, etc. Moreover, once the reason (intent) for the user's contacting the automated customer service system is determined, the issue becomes whether or not the automated customer service system can benefit from this determination, or prediction, while trying to understand the user speech utterances or textual input during the dialogue session.

The illustrative embodiments provide mechanisms for predicting an intent of a user based on anomalies found in data stored in a user profile and resolving such anomalies. The term "user profile" herein refers to any data structures that store information related to a particular identified user. The user profile may be a single data structure or may be a plurality of data structures stored in the same computing system or distributed across multiple computing systems. In some illustrative embodiments, the user profile may comprise a plurality of different data structures associated with a plurality of different systems using these different data structures to achieve separate purposes, e.g., one data structure for billing purposes, one data structure for customer service purposes, one data structure for computing service configuration purposes, etc. The various information associated with a user, whether provided in a single data structure or a plurality of data structures in the same or different computing systems will be referred to herein as a "user profile."

Based on the predicted intent, the mechanisms of the illustrative embodiments select a representation for a user speech utterance or textual input in the dialogue that disambiguates any portions of the user input that may be considered ambiguous. For example, word disambiguation, reference disambiguation, topic disambiguation, and parse disambiguation are all types of disambiguation that may be performed based on a predicted intent of the user as identified from the anomalies associated with the user's profile. Anomaly based intent prediction to disambiguate user input leads to a more accurate response being provided by the customer service system and leads to a more rewarding interaction with the user, lessening frustration on the user. For example, prior to such mechanisms of the illustrative embodiments, if a user were to provide a user input of "Why is it so high?", which is ambiguous in that the system may not be able to determine what the term "it" is referring to, the system may respond with fixed predefined responses for inputs that are not recognized, e.g., "Sorry, I did not understand. Press 1 if you have a question about your bill. Press 2 if you have a question about your service."

With the mechanisms of the illustrative embodiments, the illustrative embodiment may predict that the user's intent is to ask about their bill and thus, respond more intelligently by providing a direct answer based on the predicted intent rather than requiring the user to go through pre-defined prompts and layers of interaction to arrive at the purpose for their input, e.g., the mechanisms of the illustrative embodiments, presented with the same question may predict that the user is intending to ask about their bill, and furthermore may determine that an anomaly is present in their user profile showing an increase in their bill due to an expiration of a promotional period. As a result, the illustrative embodiments may respond with "Your 12 month promotional discount period ended last month which is why your latest statement is higher than previous ones." Hence, the user is given the feeling that their input has been accurately understood and an immediate, and accurate response is provided.

It will be assumed, for purposes of the present description, that the illustrative embodiments are implemented in a dialogue system utilized to provide an automated or semi-automated customer service system. Such a dialogue system may make use of cognitive processing of user input, such as performing natural language question answering, cognitive information retrieval, and the like. It should be appreciated that a customer service system is only one example of a dialogue system with which the mechanisms of the illustrative embodiments may be utilized and thus, the illustrative embodiments are not limited to such. To the contrary, the illustrative embodiments may be implemented with any text-based dialogue system or dialogue system that processes text from speech. Examples of dialogue systems include a patient medical diagnostic assistance system, a patient treatment recommendation system, sales guidance systems, technical support systems, training or education systems, chatbots, various types of decision support systems in various domains, or any other dialogue system, telephone-based spoken dialogue systems, in-car based dialogue systems, intelligent meeting room dialogue systems, and the like.

Moreover, it will be assumed that the dialogue system is a text dialogue system, such as may be provided via a chat window or other text based user interface for submitting and exchanging text communications with the dialogue system, which then processes the user text input and generates a response or otherwise contacts a human representative for additional assistance. It should be appreciated that this is again only an example, and other inputs from the user to a dialogue system, such as spoken utterance or speech input which may be converted to textual format by speech-to-text conversion, for example, may be utilized without departing from the spirit and scope of the present invention.

To illustrate an operation of a dialogue system configured for customer service in accordance with one illustrative embodiment, consider the following scenario which illustrates a dialogue interaction between a user and a customer service system associated with a fictional company, ABC Wireless Company. A customer, John Smith, contacts ABC Wireless Company customer service, such as via a chat window from his web browser or via a website interface of a website associated with ABC Wireless Company. When the automated dialogue system receives the message initiation request from John Smith, the automated dialogue system (ADS) retrieves information from John Smith's user profile (which again may be a single data structure or multiple data structures in the same computing system or distributed across computing systems) and analyzes this information, e.g., using statistical analysis, pattern analysis, trend analysis, or the like. The ADS determines through such analysis that John Smith's bill was approximately $60 in the last 6 months but has suddenly increased to $105 in the last monthly statement. Further analysis performed by the ADS indicates that the customer has been benefiting from a 1-year promotional savings of $45 discount for a television service subscription, but that the promotion term has ended. These anomalies may be identified by looking at changes that have occurred to variables present in the user profile information over a specified period of time, for example. Such anomalies may be identified by applying rules to the various statistics, patterns, trends, and the like, identified by the analysis of the user profile information. In this scenario, because of the end of the promotion term, the customer's bill has increased in the last month.

The ADS of the illustrative embodiment may apply rules about acceptable deviations, may utilized past observations about similar situations with the same or different users, and correspondence with reasons for past user dialogues, such as sudden changes in monthly bills, moving to a new address, or the like, to determine a list of possible reasons for the customer contacting the customer service system with corresponding confidence values to rank the listing of possible reasons. For example, the ADS may determine that 80% of customers in a similar situation, i.e. having similar patterns of historical data, statistical data, or the like, in their user profiles, contacted the customer service system to ask why the monthly bill has increased. Moreover, it may be determined by the ADS that 55% of customers in a similar situation contacted the customer service system because, once they moved to a new address, they usually had a technical problem with their services which needed to be rectified.

Thus, there are two possible intents in this example, i.e. determining a reason for an increase in a monthly bill and reporting a technical problem with a service. A given intent may also involve changes in one or more variables. A relative ranking is created with each user intent having a likelihood or probability that the user intent will be a reason for an inquiry or other portion of a user dialogue with the ADS. The relative ranking of the two possible user intents and their likelihoods is then utilized to generate responses to the user inputs. The highest ranking user intent candidate may be selected and used, for example. Alternatively, all possible intents having a ranking equal to or above a threshold value may be selected for potential use and alternative responses may be presented to the user for consideration.

Moreover, in some cases, the likelihood of intents may be used, after being multiplied by the weight values of variables, as discussed hereafter, to re-rank their disambiguated versions of interpretations of the user input and thus, the responses generated based on processing of these disambiguated versions of interpretations, based on their correlation with the identified possible intents. An interpretation may be defined as an unambiguous representation of a natural language input. Interpretations can be expressed in various representation languages, including but not limited to predicate logic, propositional logic, knowledge graphs, semantic networks, mathematical functions, and so on. The relative ranking, may be modified dynamically based on continuous analysis of user inputs that provide further evidence of one of the intents being the correct intent. For example, if the ADS responds with a response that is not appropriate, the user may respond with a subsequent natural language text input which may be processed and added to the context of the dialogue with the ADS and may be used to further define which of the possible intents is the one that the user has, thereby increasing the relative ranking/weight of that intent.

Based on the determined possible intents, and possibly the selection of a highest ranking intent, ambiguities in the user input may be disambiguated. For example, if the user's original text input is a natural language question of the type "Why is it so high?", it is not clear what the term "it" is referring to and thus, this is a point of ambiguity in the user input. Through processing of the user profile, and optionally user profiles of other users having a similar history or statistical data, patterns or trends in data, etc. as the user profile of the questioning user, the ADS may determine that there are two possible logical values where "it" refers to "bill" or "rate."

A fuzzy logic mechanism may be utilized to determine a weight value for each of the variables in each of the possible intents, as described hereafter, to generate a relative ranking associated with the possible intents. Based on this relative ranking, a final intent may be selected and used to disambiguate the original user input, e.g., the natural language text input from the user may be disambiguated to "Why is my bill so high?" The disambiguated user input may then be processed using natural language processing (NLP) mechanisms, questioning answering by a Question Answering (QA) system, or the like. For example, having now predicted that the user's intent is to ask about their most recent bill, the QA system may process the disambiguated input question of "Why is my bill so high?" by responding with an answer of the type "Your 12 month discounted period ended last month."

Thus, the illustrative embodiments provide mechanisms for analyzing anomalies in the information of a user profile to predict why the user is possibly contacting the automated dialogue system (ADS), such as a customer service system. These anomalies may take many different forms depending on the particular domain of the implementation of the illustrative embodiments as well as the desired implementation itself, e.g., what trends, factors, statistical measures, and the like, to look for that are indicative of an anomaly. In some illustrative embodiments, anomalies are identified by identifying changes in one or more variables that are indicative of something in the user's profile that may be unexpected or unusual, e.g., changes in one or more variables that meet or exceed a determined threshold value. It should be appreciated that anomalies may be identified using rules that correlate changes in multiple variables as well, e.g., if there is at least a 20% increase in the user's overall bill compared to last month, and the user's rate has increased by at least 25% over the last 15 days, then an anomaly may be identified.

In some cases, a periodic, continuous, or event based evaluation of the user's profile may be performed to identify anomalies prior to user inputs being received. That is, in some illustrative embodiments, as new data is added to the user's profile, e.g., a new monthly bill is generated and/or received, the process for evaluating the user's profile with regard to the newly added data to identify anomalies may be automatically performed. If an anomaly is identified, operations as set forth herein for determining a relative ranking or weight of the anomaly, e.g., using fuzzy logic, may be utilized. The identified anomaly and corresponding ranking/weight may be stored in an anomaly data structure in association with the user profile for later use should the user contact the ADS with a user input.

The predictions about the user intent are used to reduce ambiguities in understanding of user input to the ADS. For example, the relative ranking/weights of the predictions may be used to disambiguate ambiguous terms in the natural language user input by performing semantic parsing and inserting alternative entry points for natural language processing in ranked order with their respective weights (also referred to herein as confidence values).

For example, with the previous example above, when the analysis of the user utterance is complete, there are two possible interpretations of the user input. Each interpretation has a confidence value. The confidence values determine a relative ranking. For example, the word "is" may indicate that the variable to the right, "high" is equivalent to the variable to the left "it" with confidence 0.7. This may be based on a variety of natural language relation extraction models, for example, statistical or probabilistic or neural network or pattern-based. For a statistical model, such as maximum entropy, features of the various terms to the left and right of the word "is" and the word "is" itself (could be "are" or "is equal to", for example) are features that are used to train the model given many examples. At the conclusion of this training, there is a classifier that takes as input various features of the tokens or words in the input and suggests a relationship between the entities when the various features are presentation, but with a confidence. The confidence value is maintained and updated as ambiguities are resolved. So, for example, "it" may be resolved to "bill" as the reference and then the utterance "bill is high" results in a relation extraction indicating a focus of "bill" in a relationship to "high". The confidence of this interpretation is the value 0.7.

In one illustrative embodiment, a highest ranking/weighted prediction of intent may be used to disambiguate the ambiguous terms of the user input and thereby generate a disambiguated version of the user input which is processed by the ADS, e.g., through NLP. Semantic parsing generates an interpretation with confidence C. Given an interpretation this can be directly mapped to an entry point for a function that actually computes the answer to the question or performs the task. Thus, the confidence in the entry point is also C. The interpretation can then be matched against (correlated with) each of the possible intents, each with probability P. An intent that matches may have k qualitative variables each with a weight Wk. Thus the entry point confidence is C and the fuzzy logic weight is $P*Wk1*Wk2* \ldots Wkn$, where k is the index of each qualitative variable associated with the intent. The re-ranking function is used to reorder entry points. There are weights w1 and w2 to determine the relative importance of the entry point confidence (EPC) and the combination of the likelihood of the intent and fuzzy logic weight of the various variables in the intent. $F(x)=w1*EPC+w2*FLW$, where the FLW is the multiplication of the likelihood of the intent, P, and the fuzzy logic weight of the various qualitative variables Wk.

In some illustrative embodiments, multiple disambiguated versions of the user input text may be generated and evaluated through the ADS and corresponding candidate answers/responses may be weighted according to their corresponding rank/weight, along with other evidential weights and confidence scoring mechanisms implemented by the NLP. For example, multiple different versions of the user input text may be generated as alternative disambiguated versions of the user input text, e.g., one version for the user input text of "Why is it so high?" may be "Why is my bill so high?" and "Why is my rate so high?" Both disambiguated versions may be evaluated by the ADS and an appropriate response may be selected based on the combined relative rankings of the responses, e.g., based on the relative confidence scores associated with the answers/responses. Moreover, separate responses for both alternative versions may be generated and combined to provide a combined response to the user's input. For example, a response to "Why is my bill so high?" may be "Your 12 month promotional period has expired" while a response to "Why is my rate so high?" may be "There was an increase in the prime rate last month." The combined response may be "Your 12 month promotional period has expired and there was an increase in the prime rate last month."

As part of the disambiguation operation, in one illustrative embodiment, given a user input text, e.g., "Why is it so high?", the text is filtered for references using a relation pattern, e.g., a pattern may be of the type "is <object><value>" indicating a relationship with the <object> being potential match for ambiguous terms such as "it." The unbounded ambiguous terms in the user input text are identified, e.g., unbounded pronominal references, such as "it". With a relational pattern, the pattern matches or not so the confidence is 1 or 0.

A set of potential references is generated based on the context of the user's input text which may involve elements previously mentioned during the dialogue with the ADS, general information regarding the domain indicating contextual elements, and the like. For example, in the context (environment, dialogue, GUI) etc. ("Joe", "duedate", "bill", "rate"). Variables are present in this context, e.g., "duedate", "bill", and "rate" in this example. Given the context and the variables in the context, the unbounded variables may be mapped to particular ones of these variables, e.g., "bill", "rate", or "duedate". This set of potential references are then filtered using schema information, e.g., the variable "bill" can be a number with qualitative values (e.g., "low" to "medium" to "high"), or a "duedate" could not be "high". Thus, the filtered set of potential references may be reduced to a subset of "bill" and "rate" in this case.

Thus, with the illustrative embodiments, an anaphoric reference, such as, "my payment" can be likely resolved to "user monthly payment" since the user is likely to be contacting the ADS about an increase in their monthly payment. User inputs are typically not well informed in terms of grammar or they may contain typographical errors. Sometimes the user inputs simply do not contain all the details of the situation needed to ascertain the purpose of subject of the user input. When there is ambiguity, the intent prediction mechanisms of the illustrative embodiments may be used to rank the possible interpretations of the user input and respond to the user according to the most likely scenario.

In accordance with one illustrative embodiment, the mechanisms implement four primary operations. In a first operation, the anomalies in the user profile(s) of the user initiating a dialogue session are identified to thereby identify a list of possible reasons for the user to contact the ADS. This may be done prior to, or in response to, a user initiating a dialogue session with the ADS. For example, a threshold value may be defined for various parameters of the user that may indicate potential reasons for the user contacting the ADS, e.g., the customer's rate (e.g., charge rate, usage rate, interest rate, etc.) has increased/decreased by at least x (e.g., 30%) over the last y (e.g., 15) days. The definition of such thresholds may be based on functional rules that include various factors including time, money, data rates, statistical measures, or any other applicable quantitative or qualitative factor for the particular domain indicating potential reasons for users contacting the ADS. Moreover, such thresholds may be based on analysis of other user profiles in which similar anomalies were identified and the particular thresholds determined to be applicable in those situations when these other users contacted the ADS. In some illustrative embodiments, the thresholds may be defined by subject matter experts (SMEs) based on their knowledge of the domain and what factors, changes in factors, and intensity/magnitude of such changes in factors, indicate an anomaly.

In some illustrative embodiments, the determination of a threshold value may involve a machine learning process in which the ADS determines whether or not a highest ranking predicted intent of the user was in fact the intent of the user based on the user's subsequent response to the automatically generated response from the ADS. If the predicted intent was correct, then the corresponding threshold may be determined to be correctly specified. If the predicted intent was incorrect, then the threshold may be adjusted to reduce the ranking of the predicted intent in similar situations in the future, e.g., the threshold may be increased/decreased to lessen the likelihood that such anomalies will rise to the top rank given a similar situation.

The possible intents given the detected anomalies are generated. For this operation, intent patterns specifying the potential reasons for the user's input are utilized, e.g., if it is determined that the anomaly in the user's profile data is a rate increase, the user may be initiating contact with the ADS to ask about rate rules, the policy for increasing a rate, the reason for the large increase in the rate, etc. The determination of the reasons for the user's contacting the ADS may be determined based on the detected anomalies by retrieving rules or patterns, associated with the corresponding anomaly, from a repository. The particular rules or patterns specified in the repository may be defined by a subject matter expert (SME), may be machine learned over time from training and/or operation of the ADS on user inputs, or any suitable combination of SME based and machine learning based mechanisms.

In some illustrative embodiments, as a second primary operation of the illustrative embodiments, the intensity, or magnitude, of the discrepancies in values leading to the identification of an anomaly, e.g., if a user's rate has increased from $20/month to $100/month then the intensity is $80, may be mapped to discrete sets or classifications, such as "low," "medium," and "high" which can be represented as intensity values. A fuzzy logic based method can be applied to obtain a numeric weight that can later be used for ranking the possible corresponding intents for disambiguation of the natural language processing (NLP) of the user input.

In a third primary operation, the mechanisms of the illustrative embodiment apply the weights for disambiguation in accordance with their corresponding intents. Various types of disambiguation may be performed using the weighted intents including, but not limited to, word disambiguation, reference disambiguation, topic disambiguation, and parse disambiguation. With regard to word disambiguation, the intent prediction may be used to change probabilities associated with the lexicon in the context. For example, if users complain about their "bill", then that word sense is more likely than "bill" as in "bill introduced in Congress yesterday." The ADS may have response strategies/dialogues for both and may utilize intent prediction to assist in differentiating between the multiple potential correct usages of the words/phrases.

With regard to reference disambiguation, given a vague question or statement, e.g., "I don't like your fees," the term "fees" could be instantiated as the particular fee that the user is most likely to be complaining about. This may be a general instantiation, e.g., people don't like this fee, or it may be anomalous from the user data. The illustrative embodiments may evaluate these various possibilities by evaluating the various intents based on the anomalies in the user's profile as well as other user profiles as noted above. Similarly, anaphoric references, such as "it", "she", "he", acronyms, and the like, as well as other ambiguous references may be disambiguated using the mechanisms of the illustrative embodiments.

Regarding topic disambiguation, given possible topics, such as billing statement pertaining to home phone vs. mobile phone, one topic may be more likely because of the predicted intent as determined from the anomalies found in the user profile information. For example, if the user provides a user input of "My latest bill has gone way up", the mechanisms of the illustrative embodiments may disambiguate this user input by determining that an anomaly in the user's profile indicates that the user's mobile phone bill has increased in the past month, or other predetermined time period, or that the user's profile indicates a discounted rate for a determined period has been ended. Moreover, the illustrative embodiments may determine, from analysis of other user profiles, that the users in general are communicating complaints regarding mobile phone related billing statements. As a result, the illustrative embodiments may be used to disambiguate the user's input to be referencing the user's mobile phone billing statement and a corresponding response may be generated, such as "You mean your latest bill about your mobile phone? Unfortunately, rates have increased because the discounted rate for your mobile phone has been ended last month."

With regard to parse disambiguation, given possible syntactic parse trees that capture syntactic relationships, one parse may be more likely because the predicted intent matches one versus another syntactic parse of the user input. For example, if the user input is ambiguous, e.g., "Bill now" might refer to "Bill" a person (noun) or "Bill" a process (verb). If the user's intent indicates the user may be asking about their bill, then the parse disambiguation may select "Bill" (noun) rather than "bill" (verb).

Once the user's input is disambiguated using one or more different types of disambiguation, the disambiguated output is processed by natural language processing (NLP) mechanisms or the like, to generate candidate response(s), rank the candidate response(s), and select one or more candidate response(s) for output as a response to the user's input. In one illustrative embodiment, the disambiguated output may comprise a single disambiguated version of the user's input selected based on a relative ranking of the predicted intents associated with the anomalies identified in the user profile. In another illustrative embodiment, the disambiguated output may comprise multiple different disambiguated versions of the user's input, each corresponding to a different possible predicted intent, where the different disambiguated versions, and/or their associated candidate response(s) generated by the NLP mechanisms, may be weighted according to the corresponding weights associated with the predicted intents. These weights may be combined with other weights generated by the NLP mechanisms to generate an overall weight or confidence value for the particular response, e.g., a cognitive question answering (QA) system may weight answers based on evidential analysis to generate a confidence score and this confidence score may be further weighted or affected by the weight value associated with the predicted intent.

Based on the ranked listing of responses, a final response may be selected and returned as an output to the user in response to the user input. In some cases, a plurality of responses may be output with qualifications, e.g., "If you are asking about your bill, the reason your bill increased is because . . . " and "If you are asking about your rate, the reason your rate increased is because . . . ." As a result, the response generated by the automated dialogue system is more likely to be an accurate response to the user's ambiguous input without having to request additional clarification from the user.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for predicting user intent from anomalies found in user profile information and using the predicted intent to disambiguate an ambiguous input of the user and provide an appropriate response. The mechanisms of the illustrative embodiments may be used with, or may be integrated in, any natural language processing or cognitive based automatic dialogue system, in order to process natural language input from a user, which may be spoken or textual, and provide an appropriate response taking into account the user's predicted intent to disambiguate the user's input.

FIG. 1 is an example diagram illustrating an information flow for a user-automated dialogue system (ADS) interaction in accordance with one illustrative embodiment. As shown in FIG. 1, the user 110 may access the ADS, such as via a workstation, audio capture device, smart speaker system, or any computing device capable of receiving natural language user input in either a spoken or textual format. In the case of spoken input, the spoken input may be converted to a text format using a speech to text conversion mechanism. The textual representation of the user 110 input may be provided to a semantic parser 120 for further processing. Moreover, the identity of the user 110 may be identified, e.g., via a logon process by the user 110, via a response by the user 110 to an inquiry from the ADS to user 110 identify him/herself, via an automated identification based on a device identifier associated with a device used by the user 110 to access the ADS, or any other suitable mechanism for identifying the user 110.

Based on the identity of the user 110, the ADS may retrieve corresponding user profile information 130 for the user 110. In the depicted example, in response to the user 110 accessing the ADS, the anomaly detection and intent identification engine 140 analyzes the information in the user profile to identify anomalies in the user profile information. Such anomalies may be detected by evaluating values of variables in the user profile information 130 and the differences, statistical measures, trends, or other types of analysis of changes in variable values over a particular predetermined period of time. Moreover, threshold values, rules, or the like, may be applied to the values associated with the variables, the changes, or the like, to determine if an anomaly is present and the intensity/magnitude of the anomaly.

Based on the identified changes in the user profile 130, the anomaly detection and intent identification engine 140 identifies corresponding intents associated with the changes meeting the thresholds and criteria set forth in any applied rules. The definition of such thresholds may be based on functional rules that include various factors including time, money, data rates, statistical measures, or any other applicable quantitative or qualitative factor for the particular domain indicating potential reasons for users contacting the ADS, based on analysis of other user profiles in which similar anomalies were identified and the particular thresholds determined to be applicable in those situations when these other users contacted the ADS, or the like. The thresholds may be defined manually by SMEs, or automatically, such as by way of a machine learning process.

The possible intents given the detected anomalies are generated by applying intent patterns specifying the potential reasons for the user's input, e.g., if it is determined that the anomaly in the user's profile data is a rate increase, the user may be initiating contact with the ADS to ask about rate rules, the policy for increasing a rate, the reason for the large increase in the rate, etc. The determination of the reasons for the user's contacting the ADS may be determined based on the detected anomalies by retrieving rules or patterns, associated with the corresponding anomaly, from a repository 142 associated with the anomaly detection and intent identification engine 140. The particular rules or patterns specified in the repository may be defined by a subject matter expert (SME), may be machine learned over time from training and/or operation of the ADS on user inputs, or any suitable combination of SME based and machine learning based mechanisms. Thus, for example, a rule may specify that if there is a change in the user's rate of more than 30% within 15 days, then the possible intent of a user's communication with the ADS is to ask about an increase in their rate, the policy for setting their rate, or the rate rules associated with their account. Initially, there are multiple possible intents for a given change intensity each of which is of equivalent likelihood. For example, it may be just as likely that someone is asking about why the rate is so high as to complain that the rate is so high. This forms a prior likelihood for each intent. However, with time there may be additional data about which kinds of intents users generate. For example, over time the system of the illustrative embodiments may learn that it is much more likely that users ask for a reason for the change in their bill than to complain about the change.

The identified possible intents of the user may be output to the parser 120 which parses the user's input, e.g., "Why is it so high?", and uses the possible intents to generate alternate interpretations of the natural language user input, e.g., reason (bill(high)) or reason(rate(high)). The ranking is based on three things, as mentioned previously: the likelihood of asking about the reason for a bill (the correlation with the intent), the change intensity of the bill (the fuzzy logic value), and the confidence of the parse (the likelihood that the parser got the interpretation of reason(bill(high)) correct). These interpretations can also be mapped to entry points corresponding to calculations that the system can perform (what is my bill, can then map to a route to return the bill value) or answers that the system can generate. In many cases, this alignment between interpretation and entry point is perfect and the system can simply respond, but in other cases the system may have to be constructed to operate despite only partial alignment between the interpretation and the entry point. For example, the system may know that the user is asking about their bill but if the system does not determine correctly that the user is asking about its value, the dialogue system may present a user interface through which a user may clarify the user's intent. This type of partial alignment is enabled by having the relative rankings for the interpretations. If one interpretation does not match well to an entry point, then another can be used.

For example, possibilities of "rate" and "bill" may be generated in the depicted example. In some illustrative embodiments, this essentially generates alternative disambiguated versions of the user's natural language input, e.g., "Why is my rate so high?" and "Why is my bill so high?" The alternative versions of the user's natural language input may be output to the intent ranking/disambiguation engine 160.

The change intensities for the variables corresponding to the identified anomalies may be output by the anomaly detection and intent identification engine 140 to the anomaly/intent weighting engine 150. The anomaly/intent weighting engine 150 may apply fuzzy logic to the change intensities to generate corresponding weight values. For example, the fuzzy logic may evaluate the anomalies to classify them into different classifications of sets of intensity values, e.g., low, medium, high, which have corresponding weight values, or a weight value may be calculated based on a predetermined function of the anomaly change intensity value. Thus, for example, in the depicted example, weights are generated by the anomaly/intent weighting engine 150 for the identified intents of "rate" and "bill" corresponding to changes in variables in the user profile information 130 identified by the anomaly detection and intent identification engine 140.

The weights generated by the anomaly/intent weighting engine 150 are output to the intent ranking/disambiguation engine 160. The intent ranking/disambiguation engine 160 operates on the alternative logical entry points, or alternative disambiguated versions of the user input, to generate a disambiguated output that is output to the ADS response generator 170, which may include natural language processing (NLP) to generate a response to the disambiguated output. The intent ranking/disambiguation engine 160 may apply various types of disambiguation as previously discussed above based on the weighted possible intents. In some illustrative embodiments, the disambiguated output may comprise the selection of one of the alternative logical entry points or alternative disambiguated versions of the user input based on the relative rankings/weights of the alternatives. In some illustrative embodiments, the disambiguated output may comprise the various alternative logical entry points/disambiguated versions of the user input along with their corresponding weights values.

Once the user's input is disambiguated by the intent ranking/disambiguation engine 160 to generate the disambiguated output, the disambiguated output is processed by natural language processing (NLP) mechanisms, cognitive mechanisms, or the like, of the ADS response generator 170 to generate candidate response(s), rank the candidate response(s), and select one or more candidate response(s) for output as a response to the user's input. In one illustrative embodiment, the disambiguated output may comprise a single disambiguated version of the user's input selected based on a relative ranking of the predicted intents associated with the anomalies identified in the user profile. In another illustrative embodiment, the disambiguated output may comprise multiple different disambiguated versions of the user's input, each corresponding to a different possible predicted intent, where the different disambiguated versions, and/or their associated candidate response(s) generated by the NLP mechanisms, may be weighted according to the corresponding weights associated with the predicted intents. These weights may be combined with other weights generated by the NLP mechanisms to generate an overall weight or confidence value for the particular response, e.g., a cognitive question answering (QA) system may weight answers based on evidential analysis to generate a confidence score and this confidence score may be further weighted or affected by the weight value associated with the predicted intent.

Based on the ranked listing of responses, a final response may be selected and returned as an output to the user in response to the user input. In some cases, a plurality of responses may be output with qualifications as discussed above. The responses may be provided back to the user 110 as a response to the user's original input. Thus, for example, in response to the user input "Why is it so high?", the ADS may predict that the user is either asking about their bill or their rate based on anomalies in the user's profile information 130. Based on the intensity of the changes to variables associated with the bill and rate information in the user profile information 130, a relatively higher weight may be associated with "bill" than with "rate" and thus, it may be determined that the user is most likely asking about their bill.

The result is that the intent ranking/disambiguation engine 160 disambiguates the user input to be "Why is my bill so high?" which is then input to the ADS response generator 170 which operates on the disambiguated user input to generate a response. In this case, through NLP analysis of the user profile information 130, it may be determined that the user's bill has increased because the user's promotional discount has expired. As a result, a response of "Your 12 month promotional discount period expired last month" is generated and returned to the user. Thus, from a dialogue perspective, the user asks "Why is it so high?" and the ADS responds "Your 12 month promotional discount period expired last month", which is a more natural dialogue response generated based on the computer generated prediction of the user's intent based on anomalies identified in the user's profile information.

Figure 2:
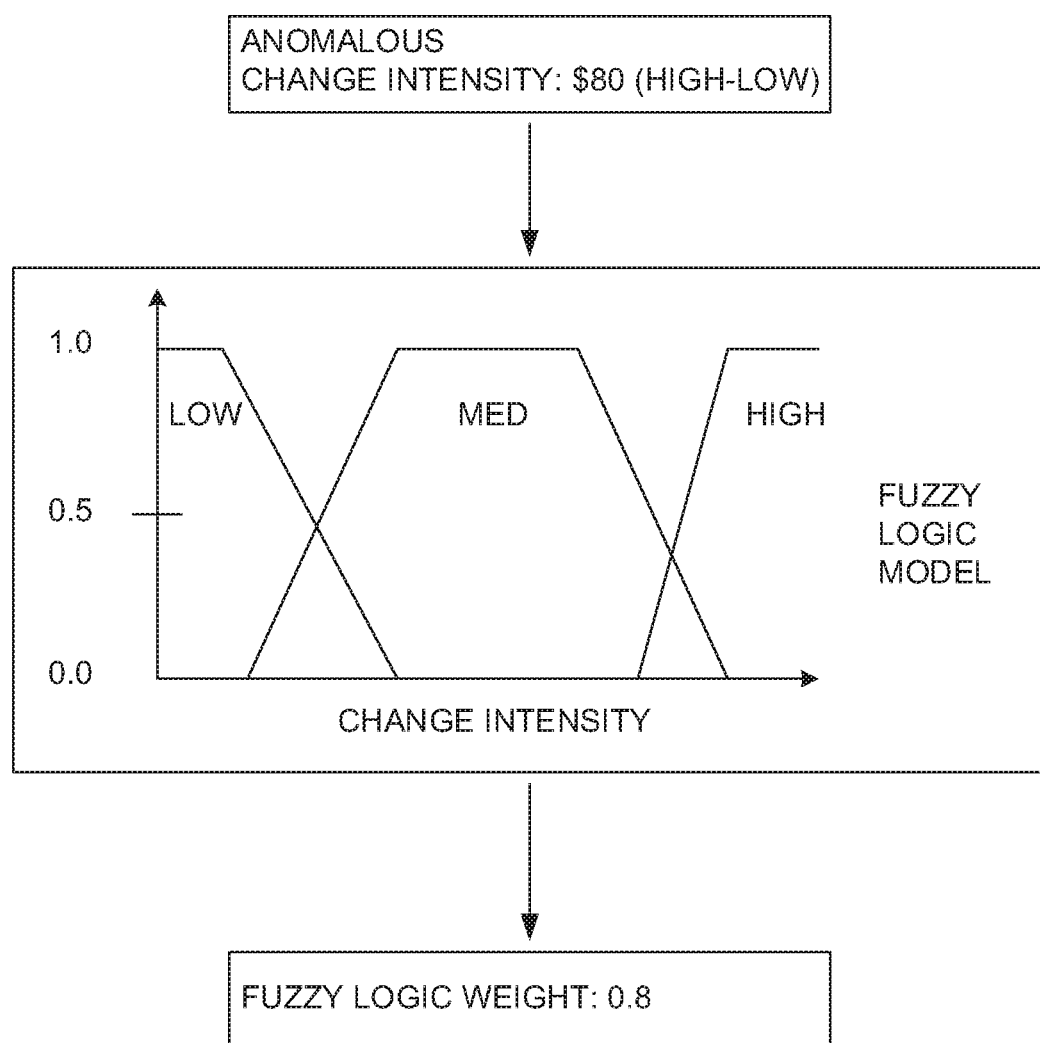
FIG. 2 is an example diagram illustrating a fuzzy logic based weight determination for an anomalous change in a variable of a user profile in accordance with one illustrative embodiment.

FIG. 2 is an example diagram illustrating a fuzzy logic based weight determination for an anomalous change in a variable of a user profile in accordance with one illustrative embodiment. As mentioned above, the anomaly intent weighting engine 150 may utilize fuzzy logic or the like, to evaluate the change intensity of a variable in the user profile information to determine a weight value to be associated with the corresponding intent associated with that change. Fuzzy logic is a form of many-valued logic in which the truth values of variables may be any real number between 0 and 1. Fuzzy logic is employed to handle the concept of partial truth, where the truth value may range between completely true and completely false. In the present context, the fuzzy logic is used to evaluate a level of certainty that the anomaly found in the user profile information is a reason, or intent, for the user's communication with the ADS.

As shown in FIG. 2, once the anomaly detection is performed and corresponding intents are identified by identifying changes in variables in the user profile that meet or exceed one or more threshold values, the change intensities, or magnitudes, are input to a fuzzy logic model or cognitive system model that classifies the change intensity and associates a weight value to the change intensity. For example, a fuzzy logic function may be defined that associates different ranges of change intensity to different fuzzy logic weight values, e.g., for a range of change intensity falling within a "low" classification, an associated fuzzy logic weight value may be 0.2 whereas for a "high" classification, the associated fuzzy logic weight value may be 0.8. The particular values may be determined based on functions employed by the particular fuzzy logic of the particular implementation. In some cases, fixed weights for particular classifications may also be specified. In the depicted example, given a variable for a customer's monthly bill amount, the change intensity may be determined by the difference between the lowest bill amount within a given period of time and the highest bill amount within the given time, which in this case is $80. This change intensity may be mapped along the x-axis of the graph representing the fuzzy logic function or model, and a corresponding weight value on the y-axis may be retrieved. In this example, the fuzzy logic weight is determined to be 0.8, i.e. the change intensity falls within the "high" classification, meaning that there is a high likelihood that the intent associated with the anomaly is the reason why the user (customer) is communicating or will communicate with the ADS.

As shown in FIG. 1, the fuzzy logic weight value may be generated for each of the change intensities associated with anomalies found in the user profile information 130 and provided to the intent ranking/disambiguation engine 160. The intent ranking/disambiguation engine 160 may then rank the corresponding intents and generate disambiguations of the original user input for processing by the ADS response generator 170, which may employ natural language processing, cognitive processing, or the like, to generate a response to the user's input.

While the above description of FIG. 1 assumes that the anomaly detection and intent identification engine 140 dynamically identifies anomalies in user profile information 130 in response to a user accessing the ADS, the present invention is not limited to such. Rather, the operation of the engines 140 and 150 may be executed on user profile information 130 in response to updates being performed on the user profile information 130. These updates may be continuous, periodic, or performed in response to given events.

For example, in a customer service system environment, customers typically communicate with the ADS to discuss their bills and to obtain assistance with their service/product. Thus, for example, when a source of user profile information, such as a company billing system, generates new user profile information, e.g., a new monthly bill, that information is added to the user profile information 130. This may trigger the operation of engines 140 and 150 to evaluate the newly added information to determine if it has introduced any new anomalies in the user profile information 130. Again, this may involve applying thresholds, rules, and the like, for detecting anomalies based on changes in variable values in the user profile information 130 and associating such changes with different intents. The anomaly/intent weighting engine 150 may then classify the change intensity and assign a weight value to the anomaly/intent which is then stored in association with the user profile information 130. Hence, when the user later accesses the ADS, rather than having to perform analysis on the user profile information 130 dynamically, the anomaly detection and intent identification engine 140 may simply retrieve the stored anomaly/intent and corresponding weight information from the user profile information 130 and utilize this previously identified anomaly/intent information to perform the operations previously described above for ranking and disambiguation.

Figure 3:
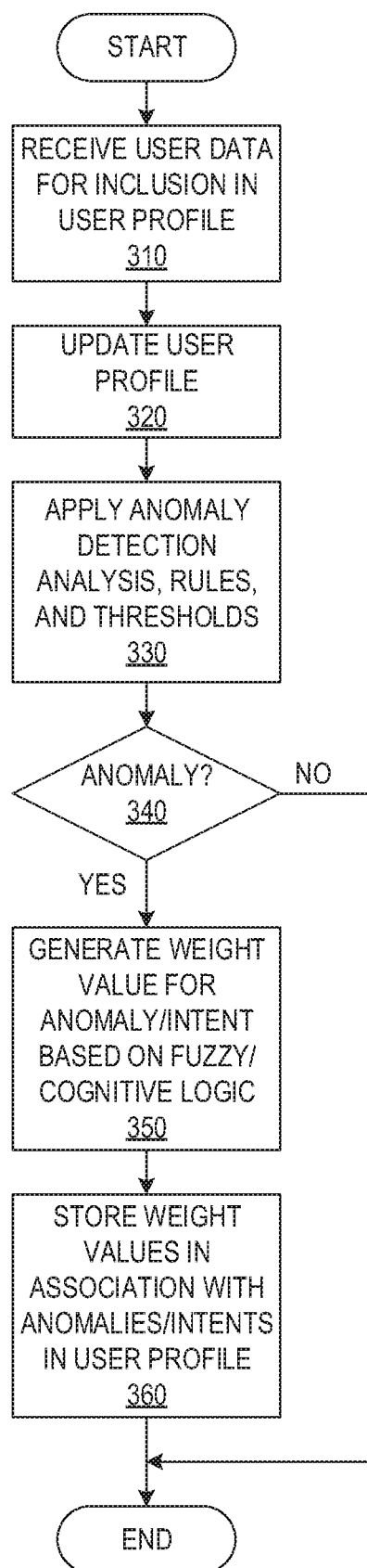
FIG. 3 is a flowchart outlining an example operation of the anomaly detection and intent identification engine and intent weighting engine in response to an update to the user profile information in accordance with one illustrative embodiment.

FIG. 3 is a flowchart outlining an example operation of the engines 140 and 150 of FIG. 1 in response to an update to the user profile information in accordance with one illustrative embodiment. As shown in FIG. 3, the operation starts when new user data is received for inclusion in the user profile information, e.g. a new monthly bill is generated by a billing system or other user profile information data source (step 310). The user profile information is updated (step 320) and anomaly detection analysis, rules, and thresholds are applied to the user profile information to determine if there are any anomalies found (step 330). If no anomalies are found (step 340), i.e. none of the new user data created a change in any variables, or combination of variables, that met or exceeded a threshold value or satisfied a criteria of a rule, then the operation terminates. If an anomaly is found (step 340), then fuzzy logic, cognitive logic, or the like, is applied to the change intensities of the variables to generate a weight value to be associated with the anomaly and its associated intent (step 350). The anomaly/intent information and corresponding weight value are then stored in the user profile information for later retrieval should the user communicate with the ADS with an ambiguous user input (step 360). The operation then terminates.

Figure 4:
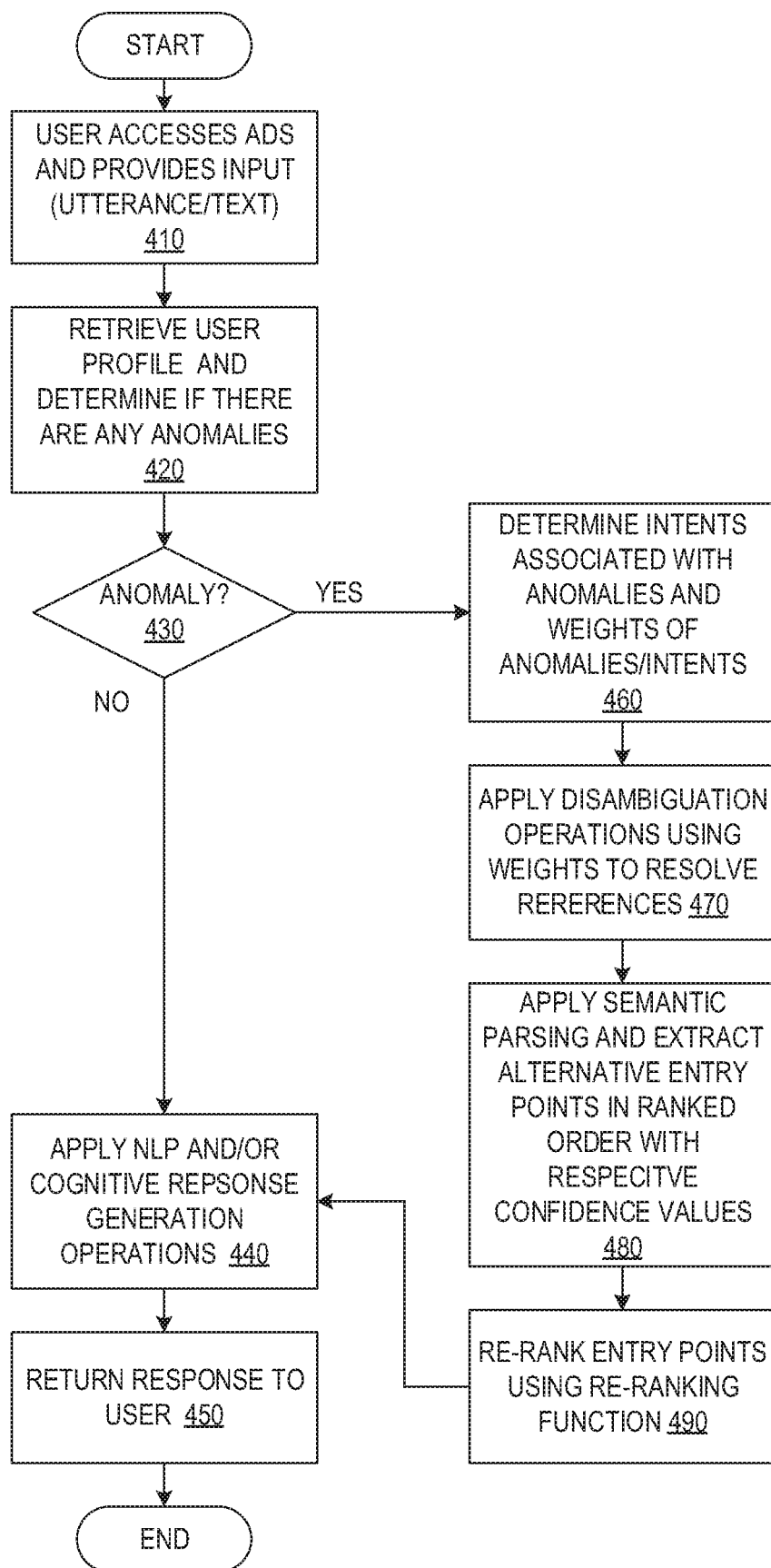
FIG. 4 is a flowchart outlining an example operation for disambiguating a user input in accordance with one illustrative embodiment.

FIG. 4 is a flowchart outlining an example operation for disambiguating a user input in accordance with one illustrative embodiment. The operation of FIG. 4 may be performed regardless of whether the anomaly detection and intent identification is performed dynamically or a priori in response to updates to the user profile. As shown in FIG. 4, in response to a user accessing the automatic dialogue system (ADS) and providing a user input, e.g., a spoken utterance or a textual input (step 410), the ADS retrieves the user profile for the corresponding user and determines if there are any anomalies present in the user profile information (step 420). The determination of whether an anomaly is present in the user profile information or not may be performed a priori, such as when new user data is used to update the user profile as described in the context of FIG. 3 above, or may be performed dynamically in response to the user accessing the ADS in step 410. Thus, depending on the implementation, step 420 may involve performing the actual analysis of user profile information to identify significant changes in variables in the user profile information, e.g., changes that meet or exceed a threshold value or satisfy a criteria of an anomaly detection rule, or may involve retrieving, from the user profile information, a listing of previous anomalies/intents and their corresponding weights as generated from an a priori analysis of the user profile information.

If an anomaly is not present (step 430), then the user input is processed using regular natural language processing (NLP) and/or cognitive operations, via an NLP system or cognitive system, e.g., question answering (QA) system, to generate a response to the user input (step 440) and the generated response is returned to the user (step 450). If an anomaly is present (step 430), then the intents associated with the anomalies are determined and the corresponding weights of the anomalies/intents are calculated (step 460). As noted above, the intents may be determined by applying rules associating intents with anomalies based on one or more detected changes, statistical measures, trends, or the like, in values of variables set forth in the user profile information. The weights associated with such anomalies/intents may be calculated using fuzzy logic, cognitive evaluations, or the like.

Disambiguation operations are then applied to the user input based on the calculated weights to resolve references (step 470). It should be appreciated that while FIG. 4 describes the disambiguation as being directed to reference disambiguation, other types of disambiguation of the user input may also be performed including, but not limited to, word sense disambiguation, topic disambiguation, and parse disambiguation, as previously mentioned above.

The semantic parser may also process an input involving an ambiguous word, for example "bill". Bill can be a noun (a bill in Congress), a verb ("bill to get payment") or a prior noun (a shortened version of William). When processing the input, there may be multiple interpretations, corresponding to each word sense, each with a probability C. Then, the interpretations are then matched against the likelihood of the intent L and multiplied times the weight value $W_k$.

The semantic parser may also process an input into a parse tree, such as a constituent or phrase structure parse or a dependency parse. The label of a node in the parse (its syntactic category—noun, proper noun, verb, etc.) or its attachment (the thing that is being qualified is the bill) may be ambiguous. In this case, the parser will output multiple syntactic parses matching the input each with a parse score (0 to 1). The syntactic parse is used to generate a given interpretation (output from the semantic parser) and thus a parse score.

Semantic parsing is applied to the disambiguated user input and alternative entry points are extracted in ranked order with respective confidence values (step 480). The entry points are then re-ranked using a re-ranking function (step 490). For example, the re-ranking function may evaluate a combination of an entry point confidence using natural language processing of the user input and a fuzzy logic weight for a given category or classification of change intensity corresponding to the entry point. An example re-ranking function may be of the type $F_{ranking}=(w_1*EPC)+(w_2*FLW)$ where EPC is the entry point confidence value calculated using natural language processing methods, FLW is the fuzzy logic weight for the given category or classification of change intensity, $w_1$ is the weight of EPC in the re-ranking function, and w2 is the weight of the FLW in the re-ranking function.

The responses are generated directly by executing functions on the entry points. For example, if a user asks about the current monthly bill then the system can map this to an entry point get_amount(variable, period, point) and set variable to "bill", period to "month" and point to "current". Then there is code that executes or a query constructed that runs to actually retrieve the current value of the monthly bill in the target computer system.

The re-ranked entry points of the user input, encompassing the alternative entry points generated in step 480 based on the disambiguation operations and weights determined in steps 460 and 470, are used by the NLP and/or cognitive response generation operations (step 440) to generate a response to the user input which is then output (step 450) and the operation terminates.

Figure 5:
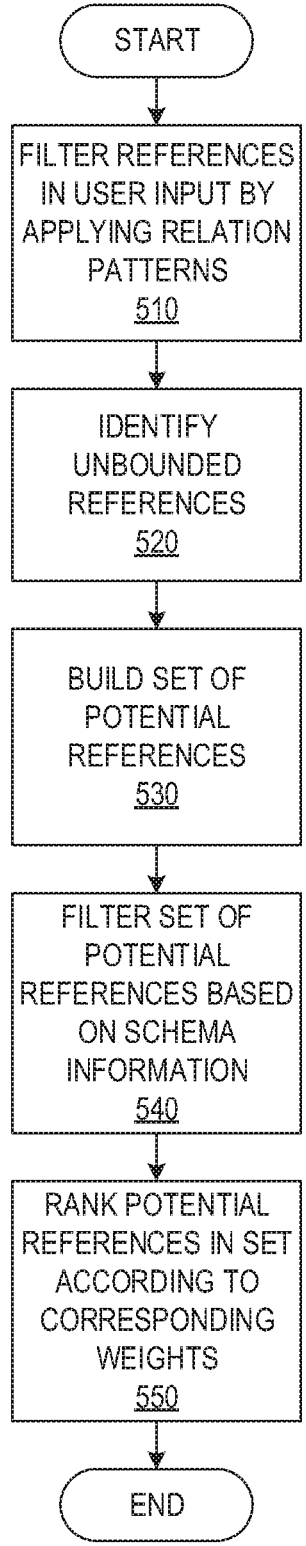
FIG. 5 is a flowchart outlining an example operation for performing a reference disambiguation based on weights determined from anomaly/intent detection in user profile information in accordance with one illustrative embodiment.

FIG. 5 is a flowchart outlining an example operation for performing a reference disambiguation based on weights determined from anomaly/intent detection in user profile information in accordance with one illustrative embodiment. The operation outlined in FIG. 5 may be performed, for example, as part of the operation in step 470 of FIG. 4, to resolve references in a user input and thereby disambiguate the user input based on anomalies identified in the user profile information.

As shown in FIG. 5, the operation starts by filtering references in the user input by applying one or more relation patterns (step 510). For example, the relation pattern may be of the type "is <object><value>" which indicates a relationship. The operation in step 510 may be performed using rule-based pattern matching but may also be done using a statistical model. A portion of the user input, e.g., "Why is it so high?" matching the pattern indicates that "it" is a thing because it matches <object> and "it" has a <value>, e.g., "high", but does not have a gender. This narrows down the list of types of "things" that could match the term "it" from people, variables, etc. to just variables, for example.

Having filtered the references, references that are unbounded are identified, e.g., the pronominal reference "it" is identified as an unbounded reference as there is no conversation prior to this user input (step 520). A set of potential references are then built (step 530). For example, elements associated with the context of the user input may be utilized, e.g., the domain, environment, the dialogue, the GUI, etc. For example, it may be determined that various elements, such as "Joe", "duedate", "bill", "rate", etc. may be included in the listing of potential references. However, given that in step 510 it was determined that the reference "it" is to a "thing", the listing of potential references is reduced to those that are variables, e.g., "bill", "rate" and "duedate".

The references in the set of potential references are then filtered using schema information (step 540) that identifies attributes of the different potential references. For example, the schema may state that the variable "bill" can be a number with qualitative values (e.g., "low" to "medium" to "high") and that a "duedate" could be "high." Thus, the set of potential references becomes "bill" and "rate".

Thereafter, to disambiguate the reference in the user input, the set of potential references is ranked according to their weights, e.g., fuzzy logic weight values (step 550). For example, if the value or change intensity of the variables associated with the potential reference "bill" is unusually high, then it is more likely that the potential reference "bill" will match the unbounded reference "it." As a result, the highest ranking potential reference "bill" may be chosen to disambiguate the user input, e.g., disambiguate "Why is it so high?" to "Why is my bill so high?". It should be appreciated that all of the potential references may be maintained in association with their ranking and weights so that as additional information is received from the user, this relative ranking may be dynamically updated and a different potential reference may be selected to generate a more accurate response.

As mentioned previously with regard to FIG. 4, once the user input is disambiguated, such as by performing operations as described above with reference to FIG. 5, semantic parsing is applied to extract alternative entry points in ranked order with respective confidence values (step 480) and the entry points are reranked (step 490). This information is provided to the NLP or cognitive system for generation of an appropriate response which is output to the user (steps 440 and 450).

Thus, with the mechanisms of the illustrative embodiments, anomalies found in user profile information are used to disambiguate portions of natural language input from a user in order to determine an appropriate response by an automatic dialogue system (ADS) to the user input. The disambiguation uses a prediction of the user's intent, such as based on the change intensity/magnitude of anomalies found in the user's profile information and a fuzzy logic or cognitive logic based classification or weighting of these change intensities/magnitudes. Based on the predicted intent, the ambiguous portions of the user's input are disambiguated by modifying unbounded, or ambiguous, references in the user input to be directed to elements corresponding to the predicted intent. The disambiguated version(s) of the user input are then evaluated using natural language processing and/or cognitive processing operations to generate an appropriate response assuming the predicted intent. The generated response is then output to the user as a response to their input. As the user provides more input, the prediction of intent may be dynamically adjusted to reflect the new information received and thereby improve the predicted intent as more context information is obtained. This leads to a more natural and satisfying dialogue between the user and an automated dialogue system.

Figure 6:
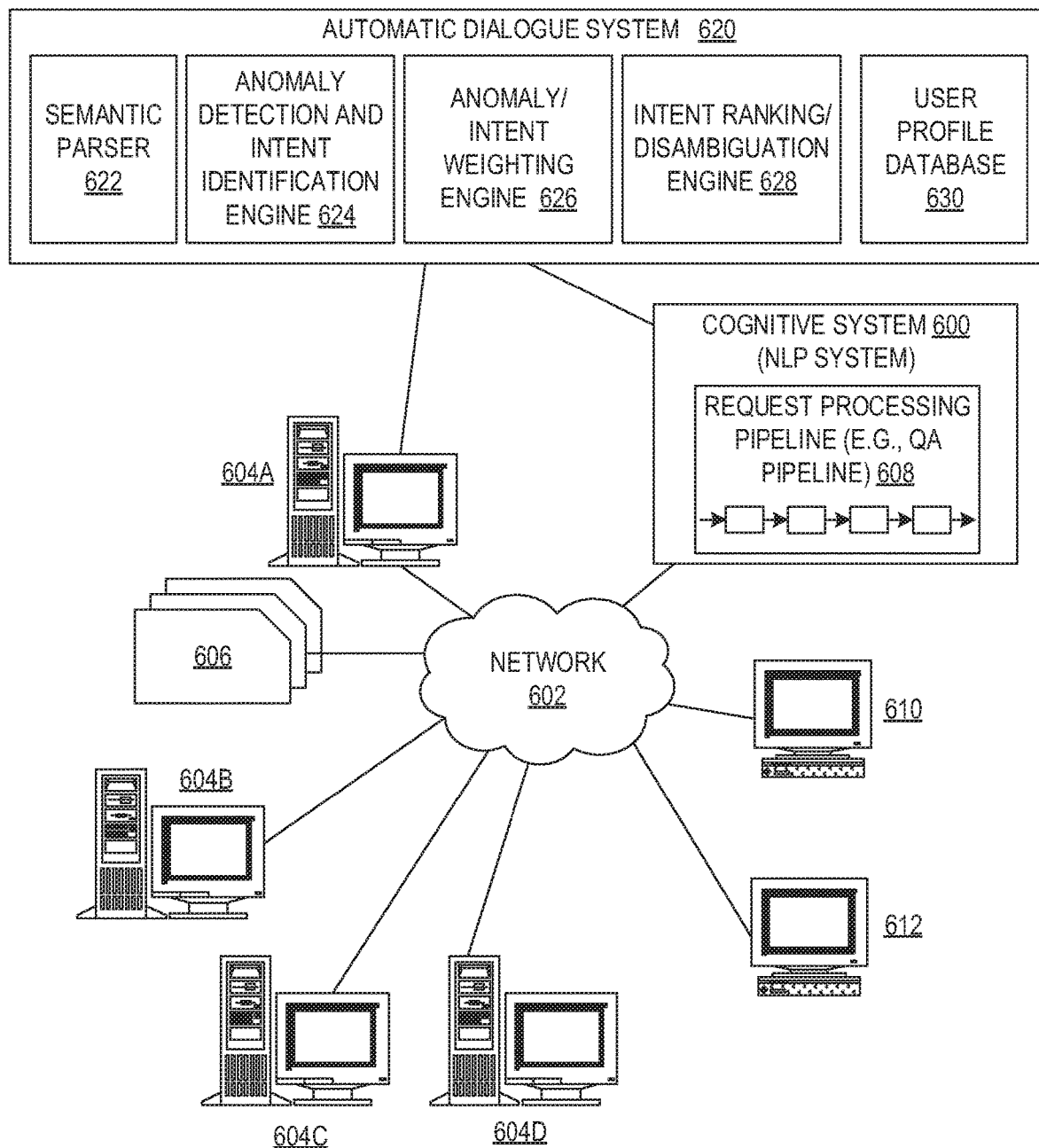
FIG. 6 is an example diagram of one illustrative embodiment of an ADS that implements a request processing pipeline for purposes of carrying on a dialogue with a user.
Figure 7:
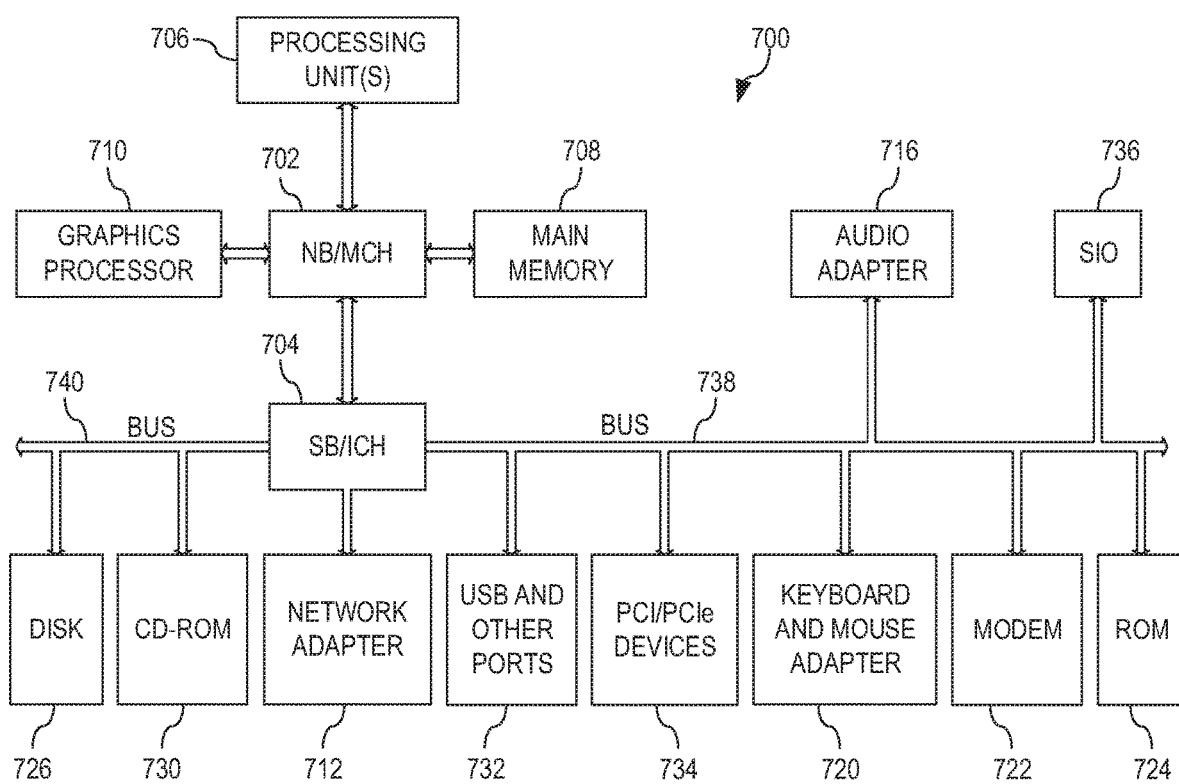
FIG. 7 is a block diagram of an example data processing system in which aspects of the illustrative embodiments are implemented.
Figure 8:
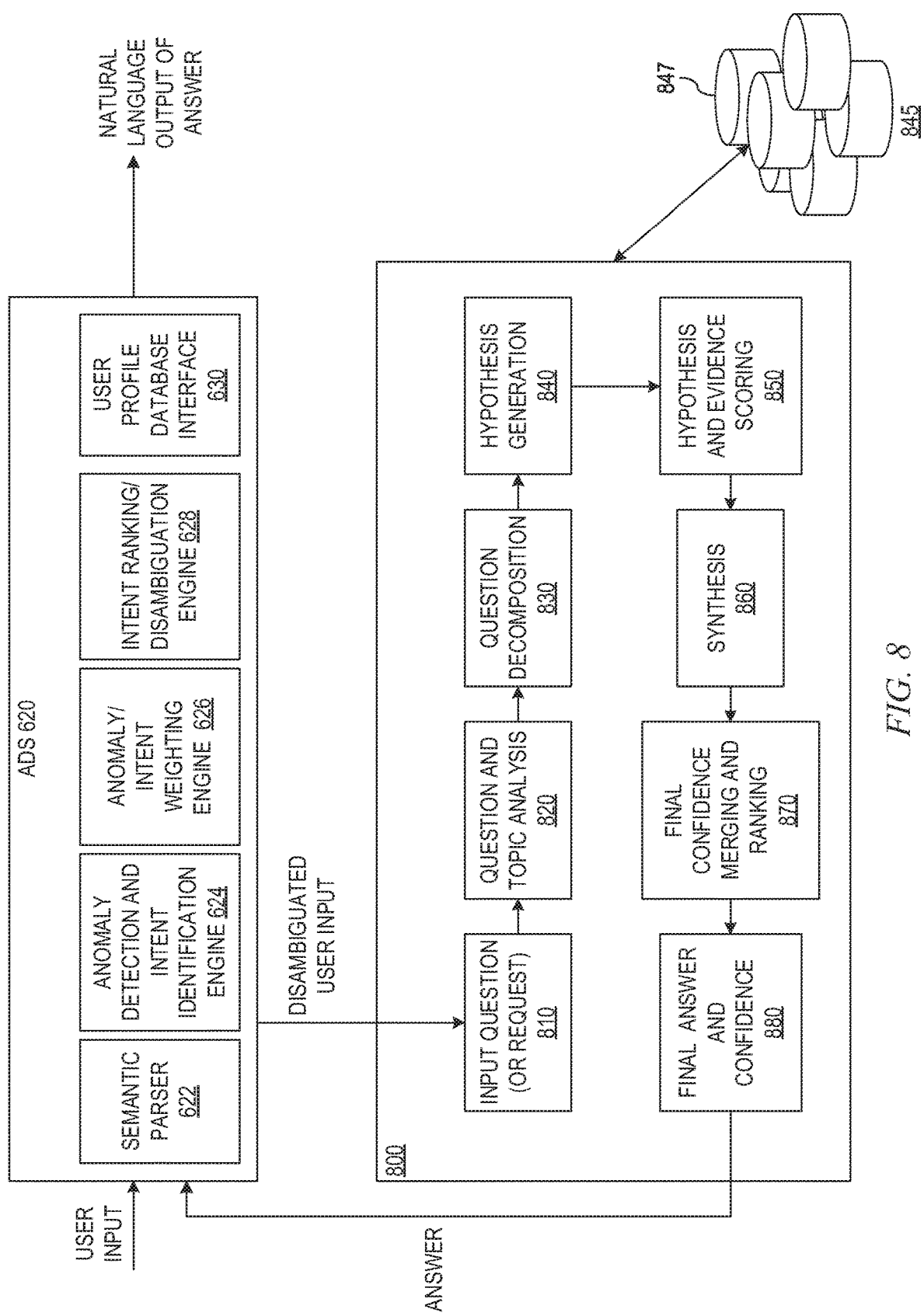
FIG. 8 is an example diagram illustrating an interaction of elements of a an ADS and a cognitive system pipeline in accordance with one illustrative embodiment.

As is apparent from the above description, the illustrative embodiments may be utilized in many different types of data processing environments. In order to provide a context for the description of the specific elements and functionality of the illustrative embodiments, FIGS. 6-8 are provided hereafter as example environments in which aspects of the illustrative embodiments may be implemented. It should be appreciated that FIGS. 6-8 are only examples and are not intended to assert or imply any limitation with regard to the environments in which aspects or embodiments of the present invention may be implemented. Many modifications to the depicted environments may be made without departing from the spirit and scope of the present invention.

FIGS. 6-8 are directed to describing an example automated dialogue system (ADS) which implements a request processing pipeline, such as a Question Answering (QA)

pipeline (also referred to as a Question/Answer pipeline or Question and Answer pipeline) for example, request processing methodology, and request processing computer program product with which the mechanisms of the illustrative embodiments are implemented. The cognitive system with QA pipeline provides capabilities for evaluating a user input and generating an appropriate response based on deep learning and evaluation of evidence from one or more corpora of electronic documents and structured/unstructured collected data. The ADS performs operations to conduct a natural language dialogue with a user via computing devices in such a way as to emulate a human interaction, but using automated computerized mechanisms. Requests received from users, e.g., spoken or text user inputs, may be provided, or converted to, structure or unstructured request messages, natural language questions, or any other suitable format for requesting an operation to be performed by the ADS. In accordance with the illustrative embodiments, the ADS disambiguates the user input based on a prediction of intent of the as indicated from anomalies in the user profile information, and provides the disambiguated user input to the cognitive system for evaluation and generation of an appropriate response.

It should be appreciated that while the illustrative embodiments shown in FIGS. 6-8 assume a cognitive system implementation, the illustrative embodiments may be implemented with regard to any natural language processing (NLP) based mechanism that is capable of generating automated responses to spoken or textual inputs from a user without departing from the spirit and scope of the present invention. Moreover, assuming a cognitive system implementation, it should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. For example, in some cases, a first request processing pipeline may be trained to operate on input requests directed to a customer service user accounts while another request processing pipeline may be trained to answer input requests directed to service repair requests. In other cases, for example, the request processing pipelines may be configured to provide different types of cognitive functions or support different types of ADS applications, such as one request processing pipeline being used for customer service, while another request processing pipeline being configured for medical treatment recommendations, and another request processing pipeline being configured for financial portfolio questions.

Moreover, each request processing pipeline may have their own associated corpus or corpora that they ingest and operate on, e.g., one corpus for blood disease domain documents and another corpus for cancer diagnostics domain related documents in the above examples. In some cases, the request processing pipelines may each operate on the same domain of input questions but may have different configurations, e.g., different annotators or differently trained annotators, such that different analysis and potential answers are generated. The cognitive system may provide additional logic for routing input requests/questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments of the ADS. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "Why is it so high?", the cognitive system may instead receive a request of "Tell me what makes it high," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

The illustrative embodiments provide an automatic dialogue system (ADS) that operates in conjunction with, and may be integrated with, a cognitive system and its corresponding one or more QA pipelines, or request processing pipelines. The ADS receives user input, such as speech input that is converted to text by a speech-to-text conversion tool, or text directly entered by a user via a user interface, e.g., a chat window, instant messaging application, electronic mail application, or the like. The ADS processes the user input and generates a response so as to carry on a natural language dialogue between the ADS and the user that simulates the user speaking or communicating with another human being. In accordance with the illustrative embodiments, the ADS accommodates ambiguities in user input by disambiguating these ambiguities based on detected anomalies in user profile information, predicting intents based on the detected anomalies, and selecting a disambiguation of the user input for further processing by natural language processing mechanisms and/or cognitive processing mechanisms. For example, a user's input having a question with an ambiguous term or portion of natural language content may be disambiguated based on predicted intent of the user and the disambiguated question may be passed to the cognitive system for processing to generate an answer to the question. The answer may then be provided back to the user via the ADS.

As the illustrative embodiments may utilize a QA system and pipeline to assist with conducting a natural language dialogue with a user, it is important to first have an understanding of how cognitive systems and question and answer creation in a cognitive system implementing a QA pipeline is implemented before describing how the mechanisms of the illustrative embodiments are integrated in and augment such cognitive systems and request processing pipeline, or QA pipeline, mechanisms. It should be appreciated that the mechanisms described in FIGS. 6-8 are only examples and are not intended to state or imply any limitation with regard to the type of cognitive system mechanisms with which the illustrative embodiments are implemented. Many modifications to the example cognitive system shown in FIGS. 6-8 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

FIG. 6 is an example diagram of one illustrative embodiment of an ADS that employs a cognitive system 600 implementing a request processing pipeline 608, which in some embodiments may be a question answering (QA) pipeline, for purposes of carrying on a dialogue with a user. For purposes of the present description, it will be assumed that the request processing pipeline 608 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety.

The ADS 620 and its corresponding cognitive system 600 with which it operates or is integrated, is implemented on one or more computing devices 104A-D (comprising one or more processors and one or more memories, and potentially any other computing device elements generally known in the art including buses, storage devices, communication interfaces, and the like) connected to the computer network 602. For purposes of illustration only, FIG. 6 depicts the ADS 620 and the cognitive system 600 being implemented on computing device 604A only, but as noted above the cognitive system 600 may be distributed across multiple computing devices, such as a plurality of computing devices 604A-D. The network 602 includes multiple computing devices 604A-D, which may operate as server computing devices, and 610-612 which may operate as client computing devices, in communication with each other and with other devices or components via one or more wired and/or wireless data communication links, where each communication link comprises one or more of wires, routers, switches, transmitters, receivers, or the like. In some illustrative embodiments, the ADS 620, cognitive system 600 and network 602 enables question processing and answer generation (QA) functionality for one or more cognitive system users via their respective computing devices 610-612 in a natural language dialogue between the users and the ADS 620, with the cognitive system 600 being used to provide answers for response generation by the ADS 620. In other embodiments, the cognitive system 600 and network 602 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 600 may be used with components, systems, subsystems, and/or devices other than those that are depicted herein.

The ADS 620 is configured to receive user inputs, which may be natural language questions, natural language requests, or the like, from client computing devices 610, 612 via the network 602. The user input may be posed in the form of a natural language question, natural language request for information, natural language request for the performance of a cognitive operation, or the like, and may be provided as speech input that is converted to natural language text, natural language text directly, or the like. The natural language text corresponding to the user input may be processed by natural language processing (NLP) logic of the ADS 620 and/or cognitive system 600 to extract features of the natural language text and evaluate these features. For example, ambiguous portions of the natural language text may be identified, such as via semantic parser 622 for example, in accordance with the illustrative embodiments, as described previously.

The ADS 620 comprises logic 624-628 that operates on user profile information in the user profile database 630, which may be part of the ADS 620, a separate database coupled to network 602, distributed across multiple computing devices accessible via network 602, or the like. For example, the anomaly detection and intent identification engine 624 may operate on the user profile information to identify anomalies based on changes in values of variables, statistical measures of such values, trends of such values, and the like, of the user profile information over a predetermined period of time. Such anomaly detection may include application of anomaly discovery rules that evaluate various criteria of the user profile information that indicates whether or not an anomaly is present in the user profile information.

The anomaly detection and intent identification engine 624 correlates anomalies with predicted user intents. Again, rules for association intents with anomalies may be defined that indicate what user intents are indicated by particular types of anomalies, e.g., if a user's bill has increased by 30% in the last billing cycle, then the user intent may be to ask about a bill increase, ask about billing policies, or to ask about billing rules.

The anomaly/intent weighting engine 626 generates weight values for the identified user intents/anomalies based on a classification of the change intensities for the variables contributing the anomaly identification. As noted above, a fuzzy logic or cognitive process may be used to evaluate the change intensities and classify them into a corresponding category or classification having an associated weight value. The weight value may then be used by the intent ranking/disambiguation engine 628 to perform intent ranking and disambiguation of the ambiguous portions of the user input. The disambiguated user input may then be provided to the cognitive system 600 for processing via the pipeline 608 to generate one or more candidate responses to the disambiguated user input, which are returned to the ADS 620 for presentation to the user, via the server 604A, network 602, and the user's client computing device 610, as part of an ongoing dialogue with the user.

The cognitive system 600 receives the disambiguated user input, which may be based on a single selected user intent and corresponding alternative version of the user input, or may include multiple different alternative versions that are associated with different user intents and having associating weight values, and processes the disambiguated user input based on information obtained from a corpus or corpora of electronic documents 106, cognitive system users, and/or other data and other possible sources of information that may be provided for handling user inquiries and requests. In one embodiment, some or all of the inputs to the cognitive system 600 are routed through the network 602. The various computing devices 604A-D on the network 602 include access points for content creators and cognitive system users. Some of the computing devices 604A-D include devices for a database storing the corpus or corpora of data 606 (which is shown as a separate entity in FIG. 6 for illustrative purposes only). Portions of the corpus or corpora of data 606 may also be provided on one or more other network attached storage devices, in one or more databases, or other computing devices not explicitly shown in FIG. 6. The network 602 includes local network connections and remote connections in various embodiments, such that the cognitive system 600 may operate in environments of any size, including local and global, e.g., the Internet.

In one embodiment, the content creator creates content in a document of the corpus or corpora of data 606 for use as part of a corpus of data with the cognitive system 600. The document includes any file, text, article, or source of data for use in the cognitive system 600. ADS 620 users access the ADS 620, and thus the cognitive system 600, via a network connection or an Internet connection to the network 602, and input questions/requests to the ADS 620 that are disambiguated by the ADS 620 if needed, and processed by the cognitive system 100, so as to answer the input questions/process the requests based on the content in the corpus or corpora of data 606. In one embodiment, the questions/requests are formed using natural language and are disambiguated, if necessary, by the ADS 620 into alternative forms of the natural language user input in which ambiguous portions are disambiguated based on detected anomalies in user profile information and corresponding user intents. In cases where no ambiguous portions are identified in the user input, the natural language questions/requests may be passed through to the cognitive system 600 for processing.

The cognitive system 600 parses and interprets the question/request via a pipeline 608, and provides a response to the ADS 620 which in turn formulates a natural language response and outputs the natural language response to the ADS user via their computing device, e.g., ADS user client computing 110, where the response may contain one or more answers to the question posed, response to the request, results of processing the request, or the like. In some embodiments, the cognitive system 600 provides a response to the ADS 620, and thus ultimately to the users, in a ranked list of candidate answers/responses while in other illustrative embodiments, the cognitive system 600 provides a single final answer/response or a combination of a final answer/response and ranked listing of other candidate answers/responses.

The cognitive system 600 implements the pipeline 608 which comprises a plurality of stages for processing an input question/request based on information obtained from the corpus or corpora of data 606. The pipeline 608 generates answers/responses for the input question or request based on the processing of the input question/request and the corpus or corpora of data 606. The pipeline 608 will be described in greater detail hereafter with regard to FIG. 8.

In some illustrative embodiments, the cognitive system 600 may be the IBM Watson™ cognitive system available from International Business Machines Corporation of Armonk, N.Y., which is augmented with the mechanisms of the illustrative embodiments described hereafter. A pipeline of the IBM Watson™ cognitive system receives an input question or request which it then parses to extract the major features of the question/request, which in turn are then used to formulate queries that are applied to the corpus or corpora of data 606. Based on the application of the queries to the corpus or corpora of data 606, a set of hypotheses, or candidate answers/responses to the input question/request, are generated by looking across the corpus or corpora of data 606 for portions of the corpus or corpora of data 606 (hereafter referred to simply as the corpus 106) that have some potential for containing a valuable response to the input question/response (hereafter assumed to be an input question). The pipeline 608 of the IBM Watson™ cognitive system then performs deep analysis on the language of the input question and the language used in each of the portions of the corpus 606 found during the application of the queries using a variety of reasoning algorithms.

The scores obtained from the various reasoning algorithms are then weighted against a statistical model that summarizes a level of confidence that the pipeline 108 of the IBM Watson™ cognitive system 600, in this example, has regarding the evidence that the potential candidate answer is inferred by the question. This process is be repeated for each of the candidate answers to generate a ranked listing of candidate answers/responses which may then be presented to the user that submitted the input question, e.g., a user of client computing device 110, or from which a final answer is selected and presented to the user, via the ADS 620. More information about the pipeline 608 of the IBM Watson™ cognitive system 600 may be obtained, for example, from the IBM Corporation website, IBM Redbooks, and the like. For example, information about the pipeline of the IBM Watson™ cognitive system can be found in Yuan et al., "Watson™ and Healthcare," IBM developerWorks, 2011 and "The Era of Cognitive Systems: An Inside Look at IBM Watson™ and How it Works" by Rob High, IBM Redbooks, 2012.

In the context of the present invention, the ADS 620 and its corresponding cognitive system 600 may provide a cognitive functionality for assisting with responding to natural language user input for purposes of providing customer service dialogues to assist customers with problems that they may be encountering with a product or service. The customer service based ADS 620 and corresponding cognitive system 600 may be specifically configured for the particular domain in which it is deployed, e.g., if the ADS 620 is to be used to assist customers of a utility company, then the ADS 620 may be configured to operate on requests/questions directed to accounts, services, and products associated with such utilities. The ADS 620 is augmented to include the logic, data structures, and configuration to perform disambiguation of natural language user input based on detected anomalies in user profile information and the corresponding user intents associated with such anomalies. Moreover, the ADS 620 is augmented to include logic, data structures, and configuration to perform operations for weighting various user intents based on intensities of changes in variables in the user profile information over predetermined periods of time, rank such user intents based on the weightings, and disambiguate the user input based on the ranked and weighted user intents and the corresponding alternative texts associated with these user intents.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 7 is provided as an example of one type of data processing system in which aspects of the present invention may be implemented. Many other types of data processing systems may be likewise configured to specifically implement the mechanisms of the illustrative embodiments.

FIG. 7 is a block diagram of an example data processing system in which aspects of the illustrative embodiments are implemented. Data processing system 700 is an example of a computer, such as server 604 in FIG. 6, in which computer usable code or instructions implementing the processes for illustrative embodiments of the present invention are located. In one illustrative embodiment, FIG. 7 represents a server computing device, such as a server 704, which implements an ADS 620 and corresponding cognitive system 600 and QA system pipeline 608 augmented to include the additional mechanisms of the illustrative embodiments described hereafter.

In the depicted example, data processing system 700 employs a hub architecture including North Bridge and Memory Controller Hub (NB/MCH) 702 and South Bridge and Input/Output (I/O) Controller Hub (SB/ICH) 704. Processing unit 706, main memory 708, and graphics processor 710 are connected to NB/MCH 702. Graphics processor 710 is connected to NB/MCH 702 through an accelerated graphics port (AGP).

In the depicted example, local area network (LAN) adapter 712 connects to SB/ICH 704. Audio adapter 716, keyboard and mouse adapter 720, modem 722, read only memory (ROM) 724, hard disk drive (HDD) 726, CD-ROM drive 730, universal serial bus (USB) ports and other communication ports 732, and PCI/PCIe devices 734 connect to SB/ICH 704 through bus 738 and bus 740. PCI/PCIe devices may include, for example, Ethernet adapters, add-in cards, and PC cards for notebook computers. PCI uses a card bus controller, while PCIe does not. ROM 724 may be, for example, a flash basic input/output system (BIOS).

HDD 726 and CD-ROM drive 730 connect to SB/ICH 704 through bus 740. HDD 726 and CD-ROM drive 730 may use, for example, an integrated drive electronics (IDE) or serial advanced technology attachment (SATA) interface. Super I/O (SIO) device 736 is connected to SB/ICH 704.

An operating system runs on processing unit 706. The operating system coordinates and provides control of various components within the data processing system 700 in FIG. 7. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 700.

As a server, data processing system 700 may be, for example, an IBM® eServer™ System p° computer system, running the Advanced Interactive Executive) (AIX® operating system or the LINUX® operating system. Data processing system 700 may be a symmetric multiprocessor (SMP) system including a plurality of processors in processing unit 706. Alternatively, a single processor system may be employed.

Instructions for the operating system, the object-oriented programming system, and applications or programs are located on storage devices, such as HDD 726, and are loaded into main memory 708 for execution by processing unit 706. The processes for illustrative embodiments of the present invention are performed by processing unit 706 using computer usable program code, which is located in a memory such as, for example, main memory 708, ROM 724, or in one or more peripheral devices 726 and 730, for example.

A bus system, such as bus 738 or bus 740 as shown in FIG. 7, is comprised of one or more buses. Of course, the bus system may be implemented using any type of communication fabric or architecture that provides for a transfer of data between different components or devices attached to the fabric or architecture. A communication unit, such as modem 722 or network adapter 712 of FIG. 7, includes one or more devices used to transmit and receive data. A memory may be, for example, main memory 708, ROM 724, or a cache such as found in NB/MCH 702 in FIG. 7.

Those of ordinary skill in the art will appreciate that the hardware depicted in FIGS. 6 and 7 may vary depending on the implementation. Other internal hardware or peripheral devices, such as flash memory, equivalent non-volatile memory, or optical disk drives and the like, may be used in addition to or in place of the hardware depicted in FIGS. 6 and 7. Also, the processes of the illustrative embodiments may be applied to a multiprocessor data processing system, other than the SMP system mentioned previously, without departing from the spirit and scope of the present invention.

Moreover, the data processing system 700 may take the form of any of a number of different data processing systems including client computing devices, server computing devices, a tablet computer, laptop computer, telephone or other communication device, a personal digital assistant (PDA), or the like. In some illustrative examples, data processing system 700 may be a portable computing device that is configured with flash memory to provide non-volatile memory for storing operating system files and/or user-generated data, for example. Essentially, data processing system 700 may be any known or later developed data processing system without architectural limitation.

FIG. 8 is an example diagram illustrating an interaction of elements of an ADS and a cognitive system pipeline in accordance with one illustrative embodiment. It should be appreciated that the stages of the QA pipeline shown in FIG. 8 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems.

As shown in FIG. 8, the QA pipeline 800 comprises a plurality of stages 810-880 through which the cognitive system operates to analyze an input question and generate a final response. In an initial question input stage 810, the QA pipeline 800 receives an input question that is presented in a natural language format, such as a disambiguated version of a question submitted by a user to the ADS 620 as part of the natural language user input. That is, the user inputs, via a user interface, an input question for which the user wishes to obtain an answer, e.g., "Why is it so high?" In response to receiving the input question, the ADS 620 may perform operations as previously described above to disambiguate ambiguous portions of the user input, e.g., the term "it" in this example, and provide disambiguated user input to the QA pipeline 800 as a disambiguated question, e.g., "Why is my bill so high?".

The pipeline 800 receives the disambiguated user input (question), or the original user input if no disambiguation is needed, in stage 810 which may perform some initial analysis of the user input for use by the question and topic analysis stage 820. The next stage of the QA pipeline 800, i.e. the question and topic analysis stage 820, parses the input question using natural language processing (NLP) techniques to extract major features from the input question, and classify the major features according to types, e.g., names, dates, or any of a plethora of other defined topics. For example, in a question of the type "Who were Washington's closest advisors?", the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases, classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 8, the identified major features are then used during the question decomposition stage 830 to decompose the question into one or more queries that are applied to the corpora of data/information 845 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 845. That is, these various sources themselves, different collections of sources, and the like, represent a different corpus 847 within the corpora 845. There may be different corpora 847 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 847 within the corpora 845.

The queries are applied to one or more databases storing information about the electronic texts, documents, articles, websites, and the like, that make up the corpus of data/information, e.g., the corpus of data 606 in FIG. 6. The queries are applied to the corpus of data/information at the hypothesis generation stage 840 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 840, to generate hypotheses for answering the input question. These hypotheses are also referred to herein as "candidate answers" for the input question. For any input question, at this stage 840, there may be hundreds of hypotheses or candidate answers generated that may need to be evaluated.

The QA pipeline 800, in stage 850, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention. In accordance with some illustrative embodiments of the present invention, the disambiguated user input that is input to the pipeline 800 may in fact comprise multiple different disambiguated versions of the user input with associated weights as generated by the ADS 620. As such, the weights may be applied when scoring the candidate answers for the different disambiguated versions so as to weight the candidate answers of one version relative to another version in generating a ranked listing of candidate answers. Thus, the ranked listing may comprise candidate answers that are generated for a plurality of different disambiguated versions of the user input and may be ranked relative to one another where the rankings are at least partially based on relative weightings of the different disambiguated versions as generated by the ADS 620, e.g., if one disambiguated version is "Why is my bill so high?" and has a candidate answer of "There was an increase in federal taxes" and a weight of 0.8, and another disambiguated version is "Why is my rate so high?" and has a candidate answer of "Your 12 month promotional discount has expired" with a weight of 0.5, then these answers may be ranked relative to one another using their respective weights of 0.8 and 0.5 for purposes of generating the ranked listing of candidate answers.

In the synthesis stage 860, the large number of scores generated by the various reasoning algorithms are synthesized into confidence scores or confidence measures for the various hypotheses. This process involves applying weights to the various scores, where the weights have been determined through training of the statistical model employed by the QA pipeline 800 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 800 that identifies a manner by which these scores may be combined to generate a confidence score or measure for the individual hypotheses or candidate answers. This confidence score or measure summarizes the level of confidence that the QA pipeline 800 has about the evidence that the candidate answer is inferred by the input question, i.e. that the candidate answer is the correct answer for the input question.

The resulting confidence scores or measures are processed by a final confidence merging and ranking stage 870 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 880, a final answer and confidence score, or final set of candidate answers and confidence scores, are generated and output to the ADS 620 for formulating a response to the user input. The response is then generated and output to the user that submitted the user input, such as via their corresponding client computing device, i.e. the natural language output of the answer to the user's ambiguous question.

Thus, the illustrative embodiments provide mechanisms for disambiguating natural language input from a user based on a prediction of user intent. The prediction of user intent is based on detected anomalies in user profile information and a fuzzy logic based evaluation classification of the intensities of such anomalies. The disambiguated natural language input may then be processed via natural language processing mechanisms to generate a response to the disambiguated natural language input.

In addition to the issues with regard to disambiguating ambiguous natural language input for use with an automated dialogue system (ADS), other key aspects of providing a user friendly ADS that more closely approximates natural language dialogues between human beings in a computerized environment is to determine how to personalize the responses generated by the ADS based on the particular user that is conversing with the ADS via a dialogue session. One aspect of some illustrative embodiments of the present invention is to further analyze the user profile information of individual users to provide information to the ADS to allow the ADS to personalize responses for individual users. Consider a situation in which a user, Ann, is being charged a rate by a company for a product or service (e.g. Internet or phone access, electricity, gas, oil, insurance, cleaning and maintenance, etc) with which the ADS is associated. Ann's rate recently went up by 30%. The fact that her rate went up by such a large amount can be used by the ADS to improve answers provided to Ann, as previously discussed above. The ADS realizes that she is likely to ask about her rate increase in the near future. This threshold change amount may be customized to the particular user rather than being generalized across all users. The ADS thus, tunes the NLP and/or cognitive system associated with the ADS to recognize vocabulary and phrases related to rate increases. Furthermore, the explanations for the rate increases can be specific to the particular user and provided to the NLP and/or cognitive system for customized responses. In this way, the NLP and/or cognitive system may be customized to handle Ann's specific rate questions.

As noted above, one of the issues is how to determine when a user profile has anomalies which would benefit from customized disambiguation and customized response generation. One way is to look at specific threshold changes and change magnitudes encountered for the specific user. For example, if a variable's amount, such as a rate, goes up by an amount exceeding a customized threshold (e.g. 30%), then the amount of change in that variable in the user profile is determined to be anomalous, and customized disambiguation and response customization takes place.

The threshold amount of change, e.g., 30%, may be determined in a manner that customizes the threshold amount to the particular user. In one illustrative embodiment, the behavior of the ADS over time both with regard to a plurality of users, and also with regard to the specific user, may be evaluated to identify statistical values, patterns, or trends in the behavior of the users with regard to the way in which the users react to changes in variables in their user profile information. For example, patterns of behavior of the users, and the specific user, may be tracked and evaluated over time when different amounts of change in variables of the user profiles are determined. For example, in some cases, a small change in a variable, e.g., a rate, such as a change of 4%, may not be significant enough to trigger too many additional dialogue sessions with users, such as dialogue sessions in which the users reference the change in the variable, e.g., ask questions about the change in their rate. For such a rate increase, disambiguation and customized responses may not be necessary. A large rate change, however, such as 30%, may be sufficient to trigger additional dialogues with users in which the ADS must response to questions from users regarding the rate change.

The ADS may analyze user profile information for a plurality of users as well as dialogues conducted with these users to determine an amount of change that represents a threshold at which a significant increase in user dialogues about the change are encountered by the ADS. The threshold levels may then be set based on this determination. For example, user profiles may be monitored by the anomaly detection and intent identification engine 624 in FIG. 6 on a periodic or continuous basis for changes in variables and/or may be evaluated responsive to a dialogue session between the ADS 620 and the user, via a user client computing device 610, for example. The monitoring correlates user dialogue sessions with changes in variables detected in the user's profile. User dialogue sessions that are determined to be initiated by a user within a predetermined time period of the detected change in variable are considered to potentially be associated with the change in the variable. Moreover, content of the user initiated dialogue session may be analyzed, such as via natural language processing, to correlate terms/ phrases in the content of the user initiated dialogue session with the particular variable that is the subject of the change.

For example, in response to a user initiating a dialogue session with the ADS 620, the anomaly detection and intent identification engine 624 may analyze the user's profile in the user profile database 630 to identify changes to variables and associate such changes with the user's dialogue session. Moreover, references to the changes in the content of the dialogue session may be identified, such as vial natural language processing or the like, as discussed above, to further identify that the user dialogue session is related to the particular change in variable. The intensity of each change may be monitored as well to correlate a particular change in a variable, the intensity of the change, and the initiation of a user dialogue session, representing a pattern of the user's behavior with regard to particular changes in variables. This may be done for a variety of different changes in variables and different intensities in changes in the same or different variables in the user profile. Thus, a behavior pattern for the particular user is developed over time that represents how that user responds to different levels of change in different variables, e.g., for a small change in a variable, the user may not initiate a dialogue session within the predetermined period of time, but for a larger change in the variable, the user may consistently initiate a dialogue within a specific period of time of the change being detected.

Such monitoring may be done over a plurality of users to generate a pattern or trend of the plurality of users with regard to their dialogue sessions. This pattern or trend may be used as a baseline for setting a threshold value for initiating disambiguation and customized response generation for all users. This baseline, or default, threshold, may be customized to each individual user in some illustrative embodiments. For example, if desired for the particular implementation, the specific behavior patterns of the specific user may be used for variable changes where the specific user has demonstrated a history of initiating dialogue sessions with the ADS. For variables where the user has not demonstrated a history of initiating dialogue sessions, the default thresholds may be utilized.

Thus, for example, via behavior pattern analysis of user initiated dialogue sessions with regard to changes in variables in user profiles, it may be determined that in general users will initiated a user dialogue with the ADS 600 in response to a 25% increase in the user's rate and a 30% increase in their overall bill. However, this particular user may not initiate dialogues with the ADS 600 even when there is a 25% rate increase and initiates dialogues with the ADS 600 in response to the bill increasing by only 20%. Thus, for this particular user, e.g., Ann, the threshold change value for the variable "rate" may be set to the 25% corresponding to the overall user behavior pattern setting for a plurality of users, and may set the threshold value for the variable "bill" to only 20% since Ann is more concerned about the increases in her bill than the increase in her rate. Hence, Ann is more likely to initiate a dialogue session with the ADS 600 to discuss her bill than to discuss her rate.

Moreover, the monitoring may be done with regard to a historical log of user initiated dialogue sessions with the ADS 620 which may be stored in the corresponding user profile of the user profile database 630 or in another data structure associated with the user profile. The historical log data structure may be analyzed to identify occurrences of user initiated dialogue sessions and key terms/phrases present in the content of such dialogue sessions which may be correlated with particular variables in the user profile. Timestamps or other metadata specifying timing of the user initiated dialogue sessions and timing of changes in variables in the user profile may be used to correlate the user initiated dialogue sessions with the changes in variables. Thus, the anomaly detecting and intent identification engine 624 may comprise further logic that identifies patterns in historical data for users that identifies past changes in variables and the corresponding previously initiated dialogue sessions, or a lack thereof.

Furthermore the logic of the anomaly detection and intent identification engine 624 may further analyze the historical log data structure of a user to determine how often a user has initiated dialogue sessions with the ADS 600 to discuss changes in a particular variable, e.g., the user's rate. The number of times such dialogues have been initiated by the user is indicative of the importance the user places on that particular variable and the changes in that variable. Thus, the number of times the user has previously initiated dialogues about changes in that variable may be used to define a weight to be associated with changes in that variable when determining how to disambiguate a natural language question or statement submitted by the user in a dialogue session, as previously discussed above.

Based on the customized threshold values and weightings associated with changes in variables in the user's profile, the resulting disambiguation and corresponding responses generated by the ADS 600 in response to such disambiguation are in effect customized for the user. That is, for each individual user the thresholds may be set based on the behavior pattern analysis performed over all users as well as behavior pattern analysis for the particular user with a combination of thresholds that are generated from both behavior pattern analysis being employed for the particular user. Moreover, the weightings of the particular changes in variables may be based on historical analysis of dialogue sessions for the particular user and thus, when disambiguation is initiated based on the customized thresholds for the user, the disambiguation and resulting responses by the ADS 600 are customized for the user based on the particular weightings identified from the historical analysis corresponding to this particular user.

Figure 9:
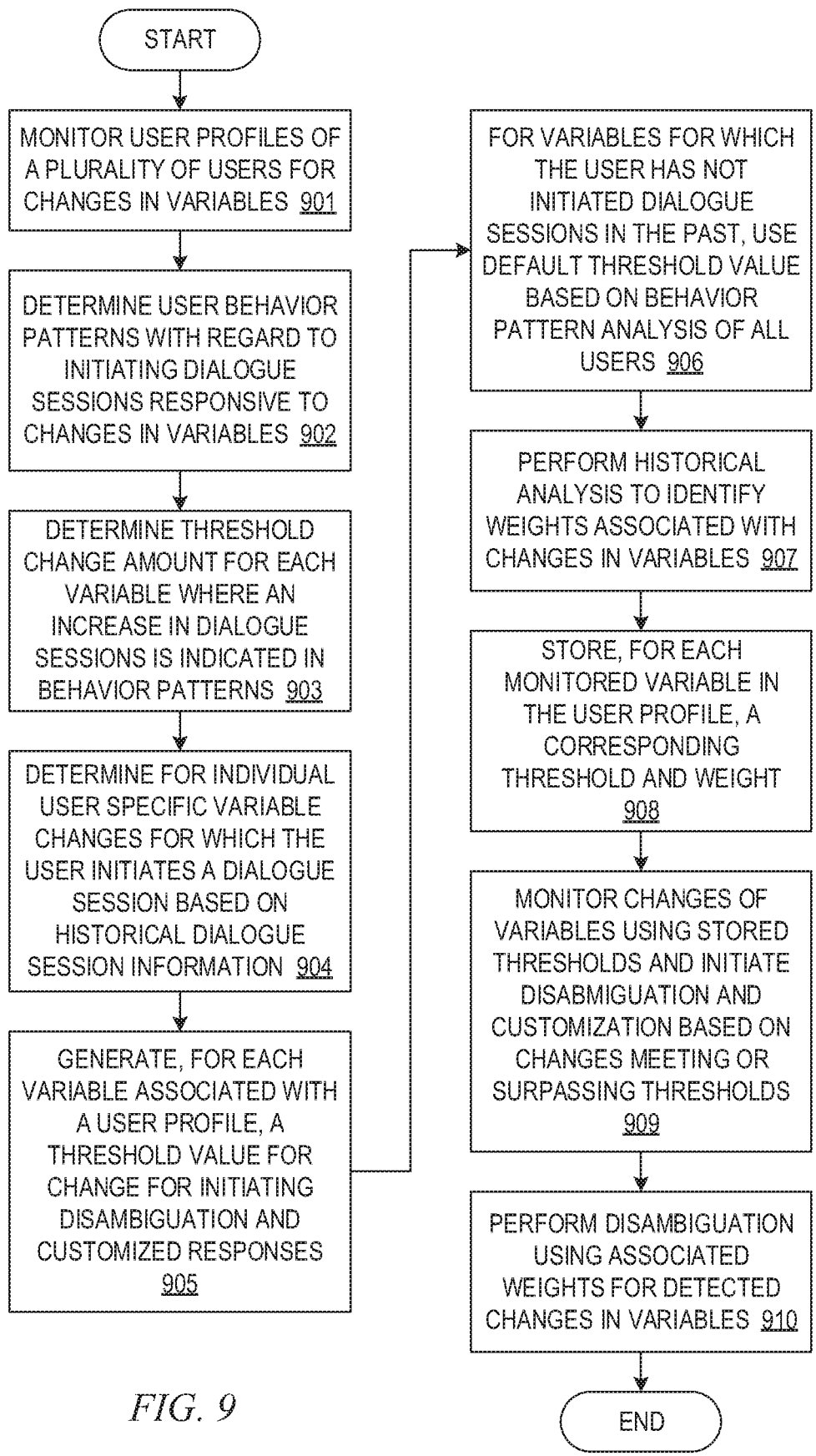
FIG. 9 depicts an example process for generating customized information for responses based on a change in a quantity in accordance with the one illustrative embodiment of the present invention.

FIG. 9 is a flowchart outlining an example operation for customizing threshold values for changes in variables and customizing disambiguation and responses of an ADS based on the custom threshold values and custom weightings in accordance with one illustrative embodiment. As shown in FIG. 9, the operation starts with the ADS monitoring user profiles of a plurality of users for changes in variables (step 901). User behavior patterns with regard to initiating dialogue sessions responsive to these changes in variables are determined (step 902). A threshold change amount for each variable where there is a significant increase in dialogue sessions indicated in the behavior patterns is determined (step 903). A "significant" increase may be determined based on a statistical analysis of the behavior patterns and indicates an amount of change in a variable where a number of dialogue sessions initiated by users referencing the change in the variable increases by at least a predetermined amount, e.g., an increase of 20% for example.

For each individual user, the historical dialogue session information for that user is analyzed to determine specific variable changes for which that user initiates a dialogue session with the ADS (step 904). Then, for each variable associated with a user profile, a threshold value for an amount of change of that variable is generated, the threshold value being a value where if the amount of change meets or exceeds that threshold value, disambiguation and customize responses are performed as previously described above (step 905). For variables for which the user has not previously initiated dialogue sessions in the past, as indicated in the historical dialogue session information, default threshold values may be utilized based on the behavior pattern analysis performed across the plurality of users (step 906).

Historical analysis of the user's dialogue sessions in the past may be performed on the historical dialogue session information associated with the user profile to thereby identify weights to be associated with changes in variables (step 907). As noted above, such weights may be based on a number of times the particular user has initiated a dialogue session in the past responsive to a change in a particular variable, for example.

For each variable in the user profile, a corresponding threshold value and weight are stored (step 908) and changes in variables are monitored using the stored thresholds to initiate disambiguation and customization (step 909). The disambiguation may be performed, at least partly, on the associated weights stored in the user profile for the detected changes in variables (step 910) and the operation terminates.

Thus, in addition to the disambiguation mechanisms described previously, the ADS 600 can also look at individual user profiles to make customization decisions. For example, if a first user, Ann, makes fewer rate inquiries than a second user, Lisa, the ADS 600 is more inclined to add customization for Lisa than for Ann. Thus, the mechanisms of the ADS 600 of the illustrative embodiments may identify a history of dialogue sessions initiated by users and determine a relative measure of how often users contact the ADS over a predetermined period of time. The user's profile may maintain a history data structure that stores information about the various dialogue sessions conducted with the user over the predetermined period of time. Based on the frequency of initiating of dialogue sessions during the predetermined period of time, threshold values and weighting values may be generated for use in making a determination as to whether or not disambiguation and customization performed by the ADS 600 is to be employed with the particular user.

The length of time the customization is performed may also be determined for the particular user in a customized manner. For example, assume that a user Ann is likely to make an inquiry regarding her rate increase shortly after she finds out about it, e.g., within 2 weeks of the actual change in the rate occurring. She is less likely to do so 7 months after she finds out about the change, i.e. 7 months after the change in rate occurs. The length of time that customization lasts can be determined by the ADS 600 by examining past behavior of the user, i.e. the historical dialogue session information stored in association with the user profile, to see how long increases in dialogue sessions last after a change in a particular variable, e.g., rate.

That is, again the history of dialogue sessions and the pattern of such dialogue sessions with identified changes in variables in the user profile may be analyzed and identified. Based on these patterns, a behavior of the user with regard to changes in variables may be determined and corresponding time periods for customization determined. For example, the analysis may determine a time period based on a correlation of dialogue sessions and their content with the particular change in variable to determine a longest time period between the occurrence of a change in the variable and an initiation of a dialogue session with the ADS 600 about the detected change in a variable. The longest time period may then be used to determined how long disambiguation and customization based on user intent as described previous may be employed for a particular change in a variable. For example, if a change in a variable is detected at time point 1, and the longest elapse of time (time threshold) that has occurred between the change in the variable and the user initiating a dialogue session with the ADS 600 to discuss the change in a variable is 4 weeks, then the disambiguation and customization based on user intent may be performed until a time point 2 that is approximately 4 weeks after time point 1.

After the determined longest elapsed time period for initiating dialogue sessions regarding particular changes in variables, the user is less likely to initiate a dialogue session about that change in the variable and thus, the disambiguation and customization may be stopped after that time point. Thus, the ADS 600 will retain disambiguation and customized information for only a limited amount of time. If, for example, Ann has not asked about a rate change after several weeks, she is not likely to ask about that rate change since it happened a while ago. Thus, the computerized ADS 600 can stop using disambiguation and customized information for responding to questions or statements in user initiated dialogue sessions after a period exceeding the time threshold has elapsed.

It should be appreciated that the time threshold may be determined in various ways in addition to or in replacement of the historical analysis discussed above. For example, the ADS 600 may analyze how long past users as a whole, i.e. across a plurality of users, have continued to question changes in a variable via dialogue sessions with the ADS 600. Suppose that past customers tend to ask questions about rate changes within the first month of a rate change. After one month, customers are less likely to ask questions about the rate change. In this case, a time threshold of one month may be selected. Another approach is to consider specifically how the particular user, e.g., Ann, responds to rate changes. For example, suppose Ann is likely to ask questions about changes for two months, i.e. a longer period of time than the average person. In such a case, the ADS 600 may select a longer time threshold of two months specifically for Ann.

In still another approach, both the individual user and the users as a whole are considered when setting the particular time threshold for a change in a variable. For example, the ADS 600 may consider both how Ann has responded to past rate changes as well as how other customers have responded to past rate changes to determine an appropriate time threshold. If there is insufficient data on how Ann has responded to rate changes to predict future questions, it is advisable to consider past questions from others (in addition to Ann's own past questions) to determine time thresholds. In the most general case, the ADS 600 considers both Ann's questions and questions from others. The ADS 600 may assign higher weight to Ann's questions based on how much information there is from Ann's past questions. If there is a lot of data from Ann's past questions, then the system will weight Ann's questions much more heavily and assign lesser weight to questions from others. If there is little data on past questions from Ann, then the ADS 600 will assign considerably higher weight to questions from others.

In some cases, information associated with an entity may not be a numerical quantity. For example, information may be contained in text documents, as discussed previously. In this case, it is important to have a measure of how similar the text documents are. When the computerized ADS 600 determines that there is a major change in a text document associated with an entity, the ADS 600 generates customized information for future questions regarding the entity. For determining if a major change has occurred in a text document, several techniques can be used, including but not limited to Levenshtein distances.

As another example, a contract or policy may be associated with an entity. When there is a major change to the contract or policy, the computerized ADS 600 can generate customized information explaining the differences in the contract or policy in anticipation of future questions. The ADS 600 can also tune the NLP and/or cognitive system to anticipate questions and dialog regarding the changes in the contract or policy.

Information associated with an entity does not have to be textual. It can be binary data in a large variety of different formats. In order to quantitatively calculate a difference between different information associated with an entity, a function can be provided to quantitatively determine a difference between different information associated with an entity.

Figure 10:
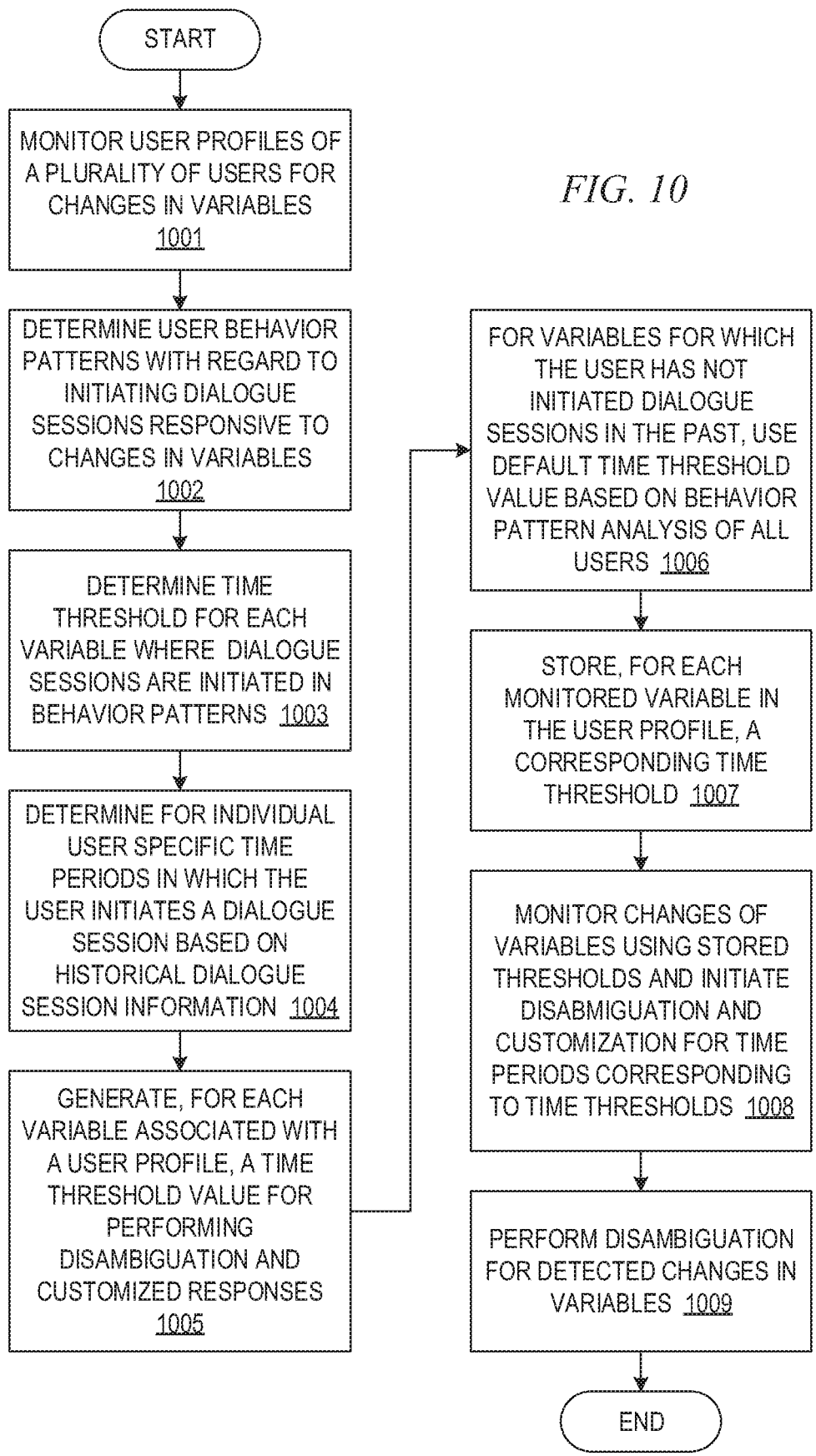
FIG. 10 depicts an example process for determining how long to use customized information for responses in accordance with one illustrative embodiment the present invention.

FIG. 10 is a flowchart outlining an example operation for disambiguation and customized response generation by an ADS based on a customized time threshold in accordance with one illustrative embodiment. As shown in FIG. 10, the operation starts with the ADS monitoring user profiles of a plurality of users for changes in variables (step 1001). User behavior patterns with regard to initiating dialogue sessions responsive to these changes in variables are determined (step 1002). A time threshold for each variable where dialogue sessions are initiated in behavior patterns are is determined (step 1003).

For each individual user, the historical dialogue session information for that user is analyzed to determine specific time periods in which the user initiates a dialogue session (step 1004). Then, for each variable associated with a user profile, a time threshold value is generated, the time threshold value being a value indicating a time period from a detected change in the variable having a significant amount of change to initiate disambiguation and customization of responses by the ADS, during which the disambiguation and customization of responses is performed as previously described above (step 1005). For variables for which the user has not previously initiated dialogue sessions in the past, as indicated in the historical dialogue session information, default time threshold values may be utilized based on the behavior pattern analysis performed across the plurality of users (step 1006).

For each variable in the user profile, a corresponding time threshold value is stored (step 1007) and changes in variables are monitored using the stored thresholds to initiate disambiguation and customization for a time period corresponding to time thresholds (step 1008). The disambiguation may be performed, for the time period specified in the time thresholds stored in the user profile for the detected changes in variables (step 1009) and the operation terminates.

Thus, in addition to the issues with regard to disambiguating ambiguous user input to an automated dialog system (ADS), other key aspects of providing a user friendly ADS that more closely approximates natural language dialogues between human beings in a computerized environment is to determine how to personalize the systems based on who is using them. One aspect of some illustrative embodiments of the present invention is to look at user profile information of individual users to provide information to allow the ADS to personalize responses for individual users. Consider a situation in which a user, Ann, is being charged a rate by a company for a product or service (e.g. Internet or phone access, electricity, gas, oil, insurance, cleaning and maintenance, etc) with which the ADS is associated. Ann's rate recently went up by 30%. The fact that her rate went up by such a large amount can be used by the ADS to improve answers provided to Ann as previously discussed above. The ADS realizes that she is likely to ask about her rate increase in the near future. The ADS thus, tunes the NLP and/or cognitive system associated with the ADS to recognize vocabulary and phrases related to rate increases. Furthermore, the explanations for the rate increases can be provided to the NLP and/or cognitive system. That way, the NLP and/or cognitive system will be customized to handle Ann's rate questions.

As noted above, one of the issues is how to determine when a user profile has anomalies which would benefit from customization. One way is to look at rate changes and their magnitude. If a rate goes up by an amount exceeding a threshold (e.g. 30%), then the user profile is determined to be anomalous, and customization takes place. The threshold (e.g., 30%) also has to be determined. One way to do this is to look at the behavior of the ADS over time. A small rate change (e.g., 4%) might not trigger too many additional questions from users. For such a rate increase, customized responses would not be necessary. A large rate change, such as 30%, would be sufficient to trigger additional questions from users. The ADS looks at how much of a rate change is needed to trigger significantly more questions and sets threshold levels based on this determination.

In addition to the disambiguation mechanisms described previously, the ADS can also look at individual user profiles to make customization decisions. For example, if Ann makes fewer rate inquiries than Lisa, the ADS would be more inclined to add customization for Lisa than for Ann.

The length of time the customization would be used for is also a key factor. Ann is likely to make an inquiry regarding her rate increase shortly after she finds out about it. She is less likely to do so 7 months after she finds out about it. The length of time that customization lasts can be determined by the system examining past behavior to see how long increases in questions last after a rate change.

Figure 11:
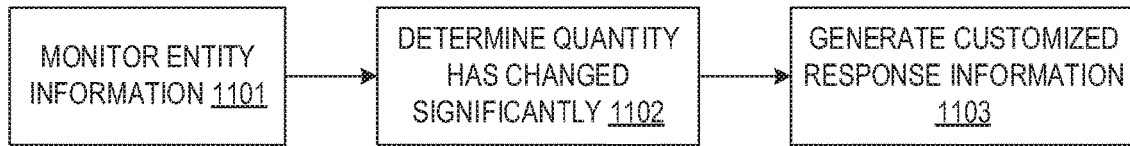
FIG. 11 depicts an example process for generating customized information for responses based on a change in a quantity in accordance with the one illustrative embodiment of the present invention.

FIG. 11 depicts an example process for generating customized information for responses based on a change in a quantity in accordance with the one illustrative embodiment of the present invention. In Step 1101, computerized automated dialog system monitors information associated with an entity, where an entity is broadly defined as a thing with distinct and independent existence. For example, an entity could be a person and/or customer accessing a computerized automated dialog system (ADS), such as ADS 620 in FIG. 6, which provides information customized to entities. An entity may also be a client computing device, such as client 610 as depicted in FIG. 6. An entity could also be an account corresponding to one or more people or a wide variety of other things within the context of the illustrative embodiments of the present invention. As an example, the computerized ADS might be operating on behalf of a company providing a product or service p1. An entity could be a customer (e.g., Ann) using the product or service. Information being monitored includes Ann's rate for using the product or service.

In step 1102, the computerized ADS determines that a quantity has changed by an amount exceeding a threshold. This change in quantity could be an increase or a decrease. The quantity in this case could be Ann's rate for using the product or service. Due to the significant change in Ann's rate, there is an increased probability that she will contact the computerized ADS to ask about the change. To anticipate this, the computerized ADS generates information to help answer questions about the rate change in Step 1103. For example, the computerized ADS could generate information explaining the reasons for the change to Ann's rate, in anticipation of questions she might ask in the near future. The computerized ADS could also tune its NLP and/or cognitive system capabilities to expect questions and dialog related to the rate increase.

One of the issues is how to determine the threshold used in step 1102. There are several possibilities. The ADS can look at how past customers have responded to rate changes. Suppose that past customers tend to ask questions when their rate goes up by more than 15%. If the rate goes up less than 15%, customers tend to ask fewer questions. In this case, a threshold corresponding to a 15% rate increase might be a good choice.

Another approach is to consider specifically how Ann responds to rate changes. For example, suppose Ann is likely to ask questions about smaller rate changes than the average person. Then it might be better to have a lower threshold value for Ann. For example, a 10% rate increase might be a better threshold choice for Ann than the 15% threshold for the average person.

Another approach is to consider both how Ann has responded to past rate changes as well as how other customers have responded to past rate changes to determine an appropriate threshold. If there is insufficient data on how Ann has responded to rate changes to predict future questions, it is advisable to consider past questions from others (in addition to Ann's own past questions) to determine thresholds. In the most general case, the ADS considers both Ann's questions and questions from others. The ADS assigns higher weight to Ann's questions based on how much information there is from Ann's past questions. If there is a lot of data from Ann's past questions, then the ADS will weight Ann's questions much more heavily and assign lesser weight to questions from others. If there is little data on past questions from Ann, then the ADS will assign considerably higher weight to questions from others.

The ADS will often retain customized information for only a limited amount of time. If Ann has not asked about a rate change after several weeks, she is not likely to ask about that rate change since it happened a while ago. Thus, the computerized ADS can stop using customized information for answering questions after a period exceeding a time threshold has elapsed.

One of the issues is how to determine the time threshold. There are several possibilities. The ADS can look at how long past customers have continued to question rate changes. Suppose that past customers tend to ask questions about rate changes within the first month of a rate change. After one month, customers are less likely to ask questions about the rate change. In this case, a time threshold of one month might be a good choice.

Another approach is to consider specifically how Ann responds to rate changes. For example, suppose Ann is likely to ask questions about changes for two months, a longer period of time than the average person. Then it might be better to have a longer time threshold of two months for Ann.

Another approach is to consider both how Ann has responded to past rate changes as well as how other customers have responded to past rate changes to determine an appropriate time threshold. If there is insufficient data on how Ann has responded to rate changes to predict future questions, it is advisable to consider past questions from others (in addition to Ann's own past questions) to determine time thresholds. In the most general case, the ADS considers both Ann's questions and questions from others. The ADS assigns higher weight to Ann's questions based on how much information there is from Ann's past questions. If there is a lot of data from Ann's past questions, then the system will weight Ann's questions much more heavily and assign lesser weight to questions from others. If there is little data on past questions from Ann, then the ADS will assign considerably higher weight to questions from others.

In some cases, information associated with an entity may not be a numerical quantity. For example, information may be contained in text documents, as discussed previously. In this case, it is important to have a measure of how similar the text documents are. When the computerized ADS determines that there is a major change in a text document associated with an entity, the ADS generates customized information for future questions regarding the entity. For determining if a major change has occurred in a text document, several techniques can be used, including but not limited to Levenshtein distances.

As another example, a contract or policy may be associated with an entity. When there is a major change to the contract or policy, the computerized ADS can generate customized information explaining the differences in the contract or policy in anticipation of future questions. The ADS can also tune the NLP and/or cognitive system to anticipate questions and dialog regarding the changes in the contract or policy.

Information associated with an entity does not have to be textual. It can be binary data in a large variety of different formats. In order to quantitatively calculate a difference between different information associated with an entity, a function can be provided to quantitatively determine a difference between different information associated with an entity.

Figure 12:
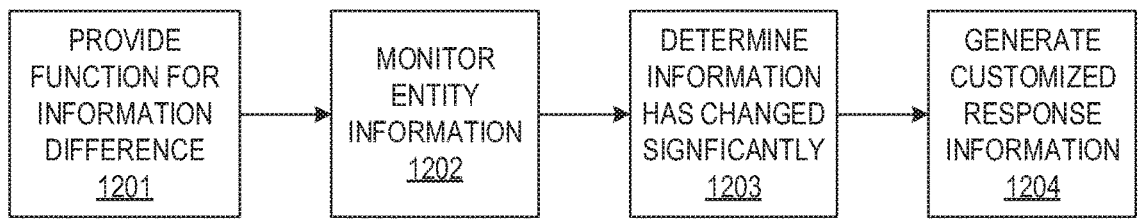
FIG. 12 depicts an example process for generating customized information for responses based on a change in information in accordance with one illustrative embodiment of the present invention.

FIG. 12 depicts an example process for generating customized information for responses based on a change in information in accordance with one illustrative embodiment of the present invention. In Step 1201, a function is provided to quantitatively determine a difference between different information that may be associated with an entity. For example, if information associated with an entity is comprised of text, then the function can compute Levenshtein distances between different information. A wide variety of other functions may be used by illustrative embodiments of the present invention as well.

In Step 1202, the computerized ADS monitors information associated with an entity. For example, a text document could be associated with an entity. In step 1203, the computerized ADS determines that information associated with an entity has changed significantly. This can be determined by applying the function provided in Step 1201 to information associated with the entity and testing whether the function value has changed by an amount exceeding a threshold. This change in a function value could be an increase or a decrease. Due to the significant change in the information associated with the entity, there is an increased probability that the computerized ADS will be asked about the change. To anticipate this, the computerized ADS generates information to help answer questions about the change in information Step 1204. For example, the computerized ADS could generate information explaining the reasons for the change in information, in anticipation of questions that might be asked in the near future. The ADS can also tune the NLP and/or cognitive system to anticipate questions and dialog regarding the change in information.

One of the issues is how to determine the threshold used in step 1203. There are several possibilities. The ADS can look at how past questions (or dialog) have changed in response to information associated with an entity changing. Suppose that more questions are asked (or other dialog is sent) if information associated with an entity changes by more than 15%. If information associated with an entity changes by less than 15%, there is not a significant increase in questions (or other dialog). In this case, a threshold corresponding to a 15% change might be a good choice.

The threshold can be determined by considering changes for several entities e1, e2, . . . , en and using the same threshold for changes in information for any of these entities.

Another approach is to customize thresholds for a specific entity. For example, the threshold for entity e1 can be determined by considering past changes in questions (or dialog) when information associated with e1 changes. While customizing thresholds for a specific entity e1 works well if there is significant data available for changes in information associated with e1, it does not work as well when there is an insufficient amount of data available for changes in information associates with e1. Another approach is to assign a threshold for e1 by considering past changes to information associated with e1 as well as past changes to information associated with other entities. If there is a significant amount of data on changes to information associated with e1, then that data is weighted more in determining the threshold for e1. If there is little data on changes to information associated with e1, then data on changes to information associated with other entities is weighted more heavily.

The system will often retain customized information for only a limited amount of time. Thus, the computerized ADS can stop using customized information for answering questions after a period exceeding a time threshold has elapsed. One of the issues is how to determine the time threshold. There are several possibilities. The ADS can look at past data on how long questions (or other dialog) tend to be asked about significant changes to information. Suppose that questions (or other dialog) about changes to information tend to be asked within the first month of a change. After one month, such questions (or other dialog) are very infrequent. In this case, a time threshold of one month might be a good choice.

The time threshold can be determined by considering changes for several entities e1, e2, . . . en and using the same time threshold for changes in information for any of these entities.

Another approach is to customize time thresholds for a specific entity. For example, the time threshold for entity e1 can be determined by considering past changes in questions (or other dialog) when information associated with e1 changes.

While customizing time thresholds for a specific entity e1 works well if there is significant data available for changes in information associated with e1, it does not work as well when there is an insufficient amount of data available for changes in information associated with e1. Another approach is to assign a time threshold for e1 by considering past changes to information associated with e1 as well as past changes to information associated with other entities. If there is a significant amount of data on changes to information associated with e1, then that data is weighted more in determining the time threshold for e1. If there is little data on changes to information associated with e1, then data on changes to information associated with other entities is weighted more heavily.

Figure 13:
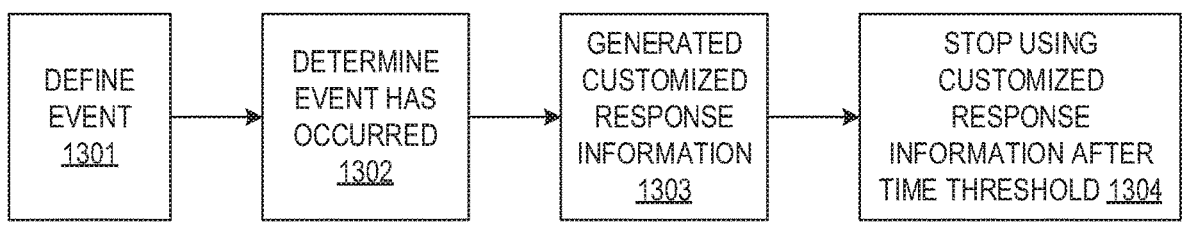
FIG. 13 depicts an example process for determining how long to use customized information for responses in accordance with one illustrative embodiment of the present invention.

FIG. 13 depicts an example process for determining how long to use customized information for responses in accordance with one illustrative embodiment of the present invention.

In Step 1301, an important event is defined. For example, in a system managing rates by a company for a product or service, an important event can be defined as a customer's rate increasing by at least 15%. In Step 1302, the computerized ADS determines that the important event has occurred. For example, the ADS could monitor rates for customers. In doing so, the ADS may determine that Ann's rate has increased by 18%, which comprises an important event. In Step 1303, the computerized ADS generates customized response information. For example, the customized response information could include explanations of the reason for the rate increase. The computerized ADS could also tune its NLP and/or cognitive system capabilities to expect questions and dialog related to the rate increase.

In Step 1304, the computerized ADS stops using the customized response information after a time threshold has elapsed.

One of the issues is how to determine the time threshold. There are several possibilities. The ADS can look at past data on how long questions (and other dialog) tend to be asked about an important event. Suppose that questions (and other dialog) about an important event tend to be asked within the first month of a change. After one month, such questions are very infrequent. In this case, a time threshold of one month might be a good choice.

The time threshold can be determined by considering an important event for several entities e1, e2, . . . en and using the same time threshold for the important event for any of these entities.

Another approach is to customize time thresholds for a specific entity. For example, the time threshold for entity e1 can be determined by considering past changes in questions (and other dialog) when the important event occurs for e1.

While customizing time thresholds for a specific entity e1 works well if there is significant data available for the event occurring for e1, it does not work as well when there is an insufficient amount of data available for the event occurring for e1. Another approach is to assign a time threshold for e1 by considering the event occurring for e1 as well as for other entities. If there is a significant amount of data on the event occurring for e1, then that data is weighted more in determining the time threshold for e1. If there is little data on the event occurring for e1, then data on the event occurring for other entities is weighted more heavily.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to implement an automatic dialogue system, for conducting a natural language dialogue between the automatic dialogue system and a user of a client computing device, wherein the method comprises:

receiving, by the automatic dialogue system, natural language text corresponding to a user input from the user via the client computing device, the natural language text having an ambiguous portion of natural language text;

analyzing, by the automatic dialogue system, user profile information corresponding to the user, to identify at least one anomaly in the user profile information, at least by identifying statistics, patterns, or trends in the user profile information over a predetermined period of time indicating an anomalous change in at least one variable of the user profile information, and determining associated factors indicating reasons for the anomalous change in the at least one variable;

predicting, by the automatic dialogue system, at least one user intent associated with the at least one anomaly, wherein the user intent indicates a potential reason for the user input from the user;

disambiguating, by the automatic dialogue system, the ambiguous portion of the natural language text based on the predicted at least one user intent to generate a disambiguated natural language text corresponding to the user input;

generating, by the automatic dialogue system, a response to the user input based on the disambiguated natural language text; and outputting, by the automatic dialogue system, the response to the client computing device to thereby conduct the natural language dialogue.

2. The method of claim 1, wherein disambiguating the ambiguous portion of the natural language text comprises at least one of word disambiguation, reference disambiguation, topic disambiguation, or parse disambiguation, based on the prediction of the at least one user intent.

3. The method of claim 1, wherein the at least one anomaly is identified by applying predefined rules to the statistics, patterns, or trends in the user profile information over the predetermined period of time, and wherein each of the predefined rules specify a corresponding threshold amount of change indicative of an anomaly for a corresponding variable in the at least one variable of the user profile information.

4. The method of claim 3, wherein the threshold amount of change specified in a predefined rule is automatically learned through a machine learning process based on other user responses to dialogue generated by the automatic dialogue system for the corresponding variable in other dialogue sessions.

5. The method of claim 1, wherein analyzing the user profile information further comprises mapping an intensity of the at least one anomaly to an intensity classification at least by generating a probability value corresponding to the intensity classification, and wherein predicting the at least one user intent associated with the at least one anomaly comprises selecting a user intent having a highest probability value for use in disambiguating the ambiguous portion of the natural language text.

6. The method of claim 1, wherein disambiguating the ambiguous portion of the natural language text based on the predicted at least one user intent comprises:
- generating, for each at least one user intent, a corresponding disambiguated version of the natural language text in which the ambiguous portion is disambiguated, wherein for different user intents in the at least one user intent, different disambiguated versions are generated with different disambiguations of the ambiguous portion;
- weighting a confidence score associated with each of the disambiguated versions of the natural language text based on a weight value associated with a corresponding at least one user intent; and
- selecting a disambiguated version of the natural language text based on the weighted confidence scores of each of the disambiguated versions.

7. The method of claim 6, wherein weighting the confidence score further comprises weighting the confidence score based on an intensity of a change corresponding to the at least one intent and a confidence of a parse of the natural language text.

8. The method of claim 1, wherein analyzing user profile information corresponding to the user to identify at least one anomaly in the user profile information and predicting at least one user intent associated with the at least one anomaly are performed prior to receiving the natural language text and the identification of the at least one anomaly and the corresponding predicted at least one user intent are stored in association with the user profile information.

9. A computer program product comprising a non-transitory computer readable medium having a computer readable program stored therein, wherein the computer readable program, when executed on a computing device, causes the computing device to implement an automatic dialogue system for conducting a natural language dialogue between the automatic dialogue system and a user of a client computing device, wherein the automatic dialogue system operates to:
- receive natural language text corresponding to a user input from the user via the client computing device, the natural language text having an ambiguous portion of natural language text;
- analyze user profile information corresponding to the user, to identify at least one anomaly in the user profile information, at least by identifying statistics, patterns, or trends in the user profile information over a predetermined period of time indicating an anomalous change in at least one variable of the user profile information, and determining associated factors indicating reasons for the anomalous change in the at least one variable;
- predict at least one user intent associated with the at least one anomaly, wherein the user intent indicates a potential reason for the user input from the user;
- disambiguate the ambiguous portion of the natural language text based on the predicted at least one user intent to generate a disambiguated natural language text corresponding to the user input;
- generate a response to the user input based on the disambiguated natural language text; and
- output the response to the client computing device to thereby conduct the natural language dialogue.

10. The computer program product of claim 9, wherein disambiguating the ambiguous portion of the natural language text comprises at least one of word disambiguation, reference disambiguation, topic disambiguation, or parse disambiguation, based on the prediction of the at least one user intent.

11. The computer program product of claim 9, wherein the at least one anomaly is identified by applying predefined rules to the statistics, patterns, or trends in the user profile information over the predetermined period of time, and wherein each of the predefined rules specify a corresponding threshold amount of change indicative of an anomaly for a corresponding variable in the at least one variable of the user profile information.

12. The computer program product of claim 11, wherein the threshold amount of change specified in a predefined rule is automatically learned through a machine learning process based on other user responses to dialogue generated by the automatic dialogue system for the corresponding variable in other dialogue sessions.

13. The computer program product of claim 9, wherein analyzing the user profile information further comprises mapping an intensity of the at least one anomaly to an intensity classification at least by generating a probability value corresponding to the intensity classification, and wherein predicting the at least one user intent associated with the at least one anomaly comprises selecting a user intent having a highest probability value for use in disambiguating the ambiguous portion of the natural language text.

14. The computer program product of claim 9, wherein disambiguating the ambiguous portion of the natural language text based on the predicted at least one user intent comprises:
- generating, for each at least one user intent, a corresponding disambiguated version of the natural language text in which the ambiguous portion is disambiguated, wherein for different user intents in the at least one user intent, different disambiguated versions are generated with different disambiguations of the ambiguous portion;
- weighting a confidence score associated with each of the disambiguated versions of the natural language text based on a weight value associated with a corresponding at least one user intent; and
- selecting a disambiguated version of the natural language text based on the weighted confidence scores of each of the disambiguated versions.

15. The computer program product of claim 14, wherein weighting the confidence score further comprises weighting the confidence score based on an intensity of a change corresponding to the at least one intent and a confidence of a parse of the natural language text.

16. An apparatus comprising:
- a processor; and
- a memory coupled to the processor, wherein the memory comprises instructions which, when executed by the processor, cause the processor to implement an automatic dialogue system for conducting a natural language dialogue between the automatic dialogue system and a user of a client computing device, wherein the automatic dialogue system operates to:
- receive natural language text corresponding to a user input from the user via the client computing device, the natural language text having an ambiguous portion of natural language text;
- analyze user profile information corresponding to the user to identify at least one anomaly in the user profile information, at least by identifying statistics, patterns, or trends in the user profile information over a predetermined period of time indicating an anomalous change in at least one variable of the user profile information, and determining associated factors indicating reasons for the anomalous change in the at least one variable;

predict at least one user intent associated with the at least one anomaly, wherein the user intent indicates a potential reason for the user input from the user;

disambiguate the ambiguous portion of the natural language text based on the predicted at least one user intent to generate a disambiguated natural language text corresponding to the user input;

generate a response to the user input based on the disambiguated natural language text; and output the response to the client computing device to thereby conduct the natural language dialogue.

* * * * *